US010924625B2

(12) United States Patent
La et al.

(10) Patent No.: US 10,924,625 B2
(45) Date of Patent: Feb. 16, 2021

(54) DYNAMIC COMPRESSION ACCELERATION USING REAL-TIME IMAGE DATA ENTROPY ANALYSIS

(71) Applicant: Xerox Corporation, Norwalk, CT (US)

(72) Inventors: Louis B. La, Webster, NY (US); David J. Metcalfe, Marion, NY (US)

(73) Assignee: XEROX CORPORATION, Norwalk, CT (US)

( * ) Notice: Subject to any disclaimer, the term of this patent is extended or adjusted under 35 U.S.C. 154(b) by 70 days.

(21) Appl. No.: 16/358,959

(22) Filed: Mar. 20, 2019

(65) Prior Publication Data

US 2020/0304677 A1  Sep. 24, 2020

(51) Int. Cl.
| | |
|---|---|
| *G06K 9/00* | (2006.01) |
| *H04N 1/23* | (2006.01) |
| *G06T 9/00* | (2006.01) |
| *G06T 7/10* | (2017.01) |

(52) U.S. Cl.
CPC ............ *H04N 1/233* (2013.01); *G06T 7/10* (2017.01); *G06T 9/00* (2013.01); *H04N 2201/0094* (2013.01)

(58) Field of Classification Search
CPC .. H04N 1/233; H04N 2201/0094; G06T 9/00; G06T 7/10
See application file for complete search history.

(56) References Cited

U.S. PATENT DOCUMENTS

| | | | | |
|---|---|---|---|---|
| 5,909,251 | A * | 6/1999 | Guichard | G06K 9/342 348/416.1 |
| 6,366,359 | B1 * | 4/2002 | Garland | H04N 1/00291 358/1.13 |
| 7,548,658 | B1 * | 6/2009 | Rudin | H04N 19/593 375/240.12 |
| 8,428,124 | B2 * | 4/2013 | Yamasaki | H04N 19/395 375/240.02 |
| 8,442,114 | B2 * | 5/2013 | Yamasaki | H04N 19/115 375/240.12 |
| 9,928,187 | B2 | 3/2018 | La et al. | |
| 2002/0186405 | A1 * | 12/2002 | Gragg | H04N 1/00294 358/1.15 |

(Continued)

OTHER PUBLICATIONS

Alex X. Liu, et al., "Xengine: a fast and scalable XACML policy evaluation engine," Proc. 2008 ACM SIGMETRICS Int'l Conf. on Measurement and Modeling of Computer Systems (SIGMETRICS '08), pp. 265-276 (2008).

*Primary Examiner* — Aaron W Carter
(74) *Attorney, Agent, or Firm* — Fay Sharpe LLP

(57) ABSTRACT

An image processing system and method are described which use entropy values in processing the image. For each of a plurality of segments of an image, the segment is considered as a stream of bits and a bit difference is computed between pairs of sequential bit sequences in the stream of bits. An entropy value of the segment is computed as a function of the bit differences. The image is processing based on the computed entropy values, which may include compressing some or all of the image segments using an acceleration factor that is based on the computed entropy value for the segment. In this way, differences in entropy, which correlate with the compressibility of the image segment, can ensure an optimal compression of the segment, or in some cases, no compression.

21 Claims, 23 Drawing Sheets

(56) References Cited

U.S. PATENT DOCUMENTS

| | | | |
|---|---|---|---|
| 2003/0021446 A1* | 1/2003 | Dietz | G06F 3/0317 |
| | | | 382/107 |
| 2003/0068085 A1* | 4/2003 | Said | G06T 7/12 |
| | | | 382/170 |
| 2004/0135903 A1* | 7/2004 | Brooks | H04N 19/91 |
| | | | 348/231.99 |
| 2004/0190619 A1* | 9/2004 | Lee | H04N 19/51 |
| | | | 375/240.16 |
| 2005/0175091 A1* | 8/2005 | Puri | H04N 19/115 |
| | | | 375/240.03 |
| 2009/0074052 A1* | 3/2009 | Fukuhara | H04N 19/152 |
| | | | 375/240.01 |
| 2009/0317008 A1* | 12/2009 | Cho | H04N 19/13 |
| | | | 382/238 |
| 2011/0075726 A1* | 3/2011 | Yamasaki | H04N 19/395 |
| | | | 375/240.02 |
| 2011/0249730 A1* | 10/2011 | Yoon | H04N 19/593 |
| | | | 375/240.08 |
| 2012/0093214 A1* | 4/2012 | Urbach | H04N 19/507 |
| | | | 375/240.01 |
| 2015/0319441 A1* | 11/2015 | Puri | H04N 19/14 |
| | | | 375/240.02 |
| 2017/0083772 A1* | 3/2017 | Kim | G06N 3/0445 |
| 2019/0004738 A1* | 1/2019 | Wu | G06F 3/0656 |
| 2020/0228148 A1* | 7/2020 | Thomas | H03M 13/6318 |
| 2020/0304677 A1* | 9/2020 | La | G06T 7/10 |

\* cited by examiner

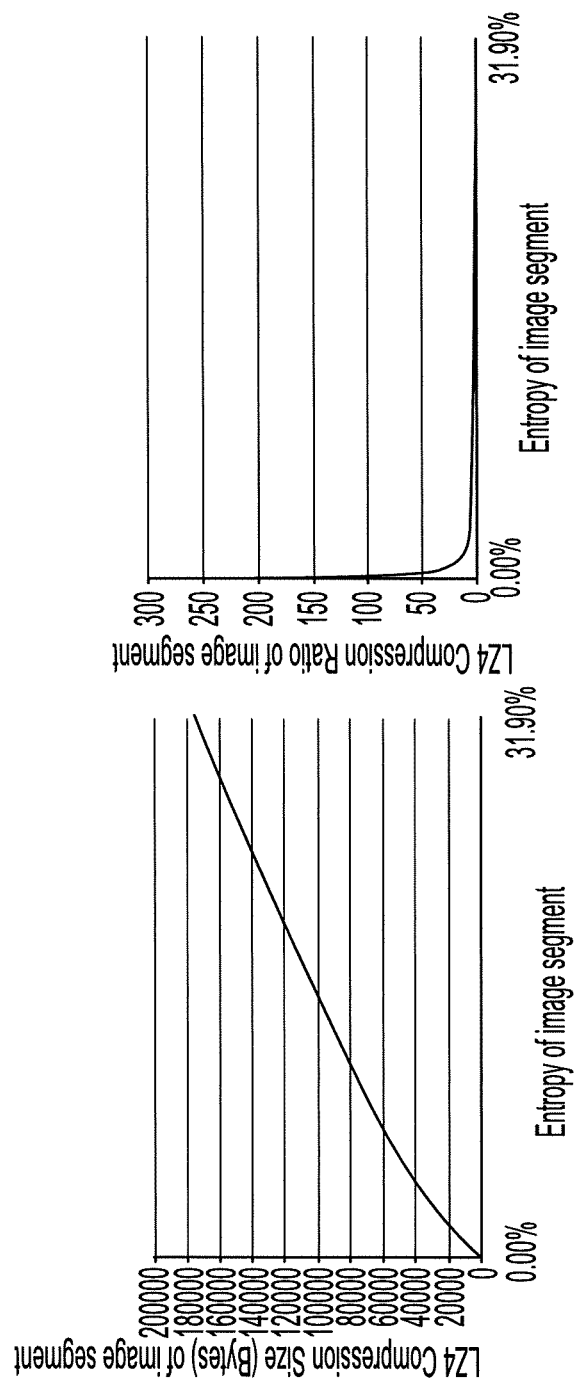

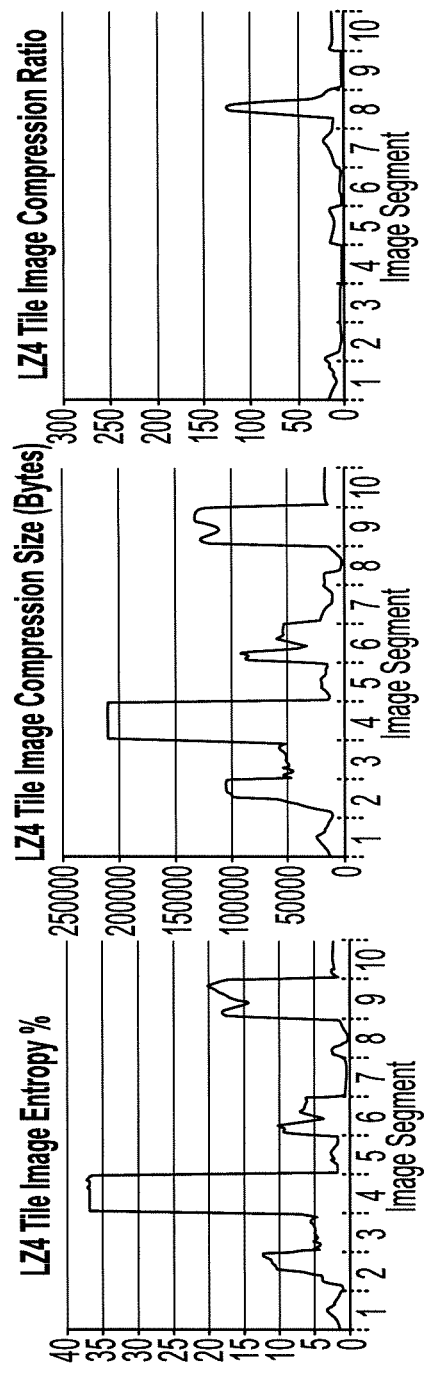

DYNAMIC COMPRESSION ACCELERATION USING REAL-TIME IMAGE DATA ENTROPY ANALYSIS

BACKGROUND

The present application relates to data compression and finds particular application in compressing digital images prior to rendering with an image rendering device.

Lossless data compression refers to a technique by which a data bitstream can be stored in a compressed bitstream consisting of fewer bits than the original bitstream. The original data bitstream can be subsequently recovered from the compressed data bitstream using decompression techniques. Various data compression algorithms exist, such as JPEG and LZ4 algorithms. Since a higher compression ratio generally results in a slower compression/decompression throughput, such algorithms aim to provide a trade-off between data compression ratio and data processing complexity.

Lossless data compression/decompression is widely used in data storage and communication systems to reduce the cost and/or improve speed performance. In high-speed, multi-function devices (MFDs), such as copy/print/scan MFDs and other digital office products, for example, software compression schemes are used to compress the digital image data before storing the compressed images in Electronic Pre-Collation (EPC) memory. This approach assists in reducing the overall memory usage, but the compression process is the slowest component in the software image path (SWIP). If the number of bits per pixel increases from the current 1 bit per pixel copy image path to a 2 bits, 4 bits, or 8 bits per pixel copy image path, or higher, this constraint could significantly degrade system performance to below the rated speed of the device.

In a typical copy/print/scan MFD, scanned images are generally compressed using the same image-quality specific and/or compression parameters regardless of image content. This approach may result in sub-par performance or non-optimized image-quality. Compressing the same image multiple times using various a priori compression-specific settings and classifying the image-type based upon the resulting compression ratios could be one solution that would enable the final compression parameters for each image to be set independently, to optimize image quality and/or data throughput rates. However, this method would be time-consuming and likely impractical in today's high-speed MFD office products.

There remains a need for improving the speed of compression of images without significant deterioration in image quality.

INCORPORATION BY REFERENCE

The following references, the disclosures of which are incorporated herein in their entireties by reference, are mentioned:

U.S. Pub. No. 20190004738, published Jan. 3, 2019, entitled METHODS FOR ACCELERATING COMPRESSION AND APPARATUSES USING THE SAME, by Wu, et al., describes a method for accelerating compression, which is performed by configuration logic of a compression accelerator.

U.S. Pat. No. 9,928,187, issued Mar. 27, 2018, entitled INCREASING DATA THROUGHPUT IN THE IMAGE PROCESSING PATH OF A DOCUMENT REPRODUCTION DEVICE, by La, et al., describes a system and method for increasing throughput in an image processing path of a digital document reproduction device. A digital image is divided into a number of tiles and for each tile, is decompressed into one of two buffers. Concurrently, the image data of the other buffer is decompressed into the image path pipeline.

BRIEF DESCRIPTION

In accordance with one aspect of the exemplary embodiment, an image processing method includes, for each of a plurality of segments of an image, computing an entropy value of the image segment. The computing of the entropy value includes considering the segment as a stream of bits, computing a bit difference between pairs of bit sequences in the stream of bits, and computing the entropy value of the segment as a function of the bit differences. The method further includes processing the image based on the computed entropy values.

One or more steps of the method may be performed with a processor.

In accordance with another aspect of the exemplary embodiment, an image processing system includes memory storing instructions for computing an entropy value of at least one segment of an input image, by considering the segment as a stream of bits, and computing a bit difference between pairs of bit sequences in the stream of bits, and computing the entropy value of the segment as a function of the computed bit differences. Instructions are also stored for processing the image based on the computed entropy value. A processor in communication with the memory executes the instructions.

In accordance with another aspect of the exemplary embodiment, an image processing method includes segmenting an input image to form non-overlapping segments. For one of the segments of the image, the segment is considered as a stream of bits, and a bit difference is computed between pairs of bit sequences in the stream of bits. An entropy value of the segment is computed as a function of the bit differences. An acceleration factor for the image segment is determined, based on the computed entropy value and the image segment is compressed, based on the acceleration factor.

BRIEF DESCRIPTION OF THE DRAWINGS

FIG. 19 is a plot showing the compression size in bytes for an image segment of the image of FIG. 18, versus the entropy value of the image segment;

FIG. 20 is a plot showing the compression ratio for an image segment of the image of FIG. 18, using LZ4 compression, versus the entropy value of the image segment;

FIGS. 22-24 illustrate image segment entropy, compression size, and compression ratio, respectively, for the cyan component of the image of FIG. 21, using LZ4 compression;

DETAILED DESCRIPTION

Figure 1:
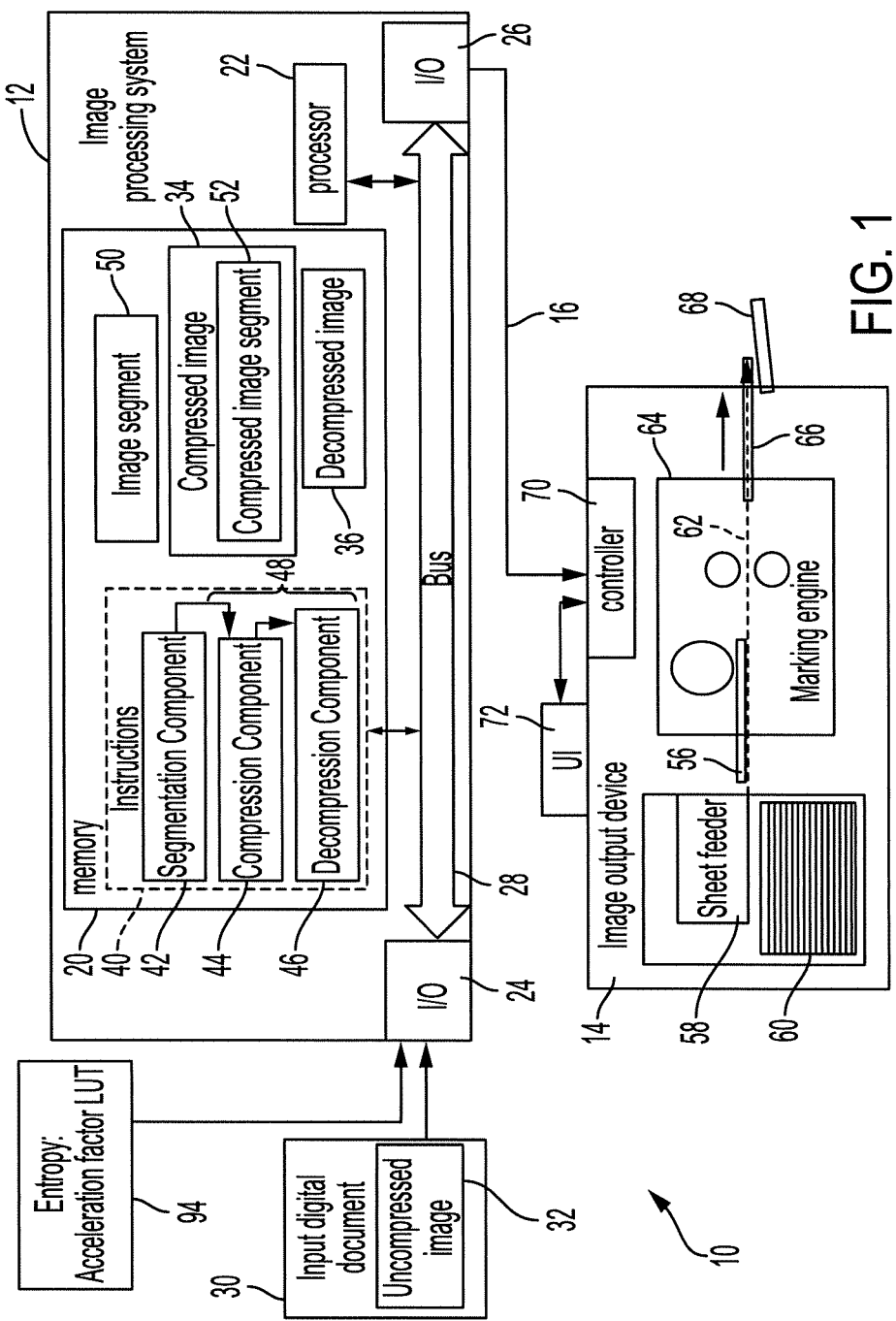
FIG. 1 is a functional block diagram of an image reproduction system in which an image processing system operates in accordance with one aspect of the exemplary embodiment.

Aspects of the exemplary embodiment provide a system and method for image processing which enable increasing image compression speed. Improved system performance is achieved by dynamically applying an optimal compression acceleration factor. The acceleration factor is based on a real-time analysis of an entropy measure of the image data.

Other aspects of the exemplary embodiment relate to the measurement of the entropy value for an image or a segment of an image.

Since the exemplary entropy measurement correlates linearly with the compressibility of the image, the system can intelligently apply an appropriate compression acceleration factor based on a given entropy measurement to improve compression speed and system performance while maintaining a desired compression ratio. The entropy measure can be used in determining a parameter of the compression method that drives a tradeoff between compression time and compression ratio. The exemplary entropy measure is a function of the percentage of bits that switch between adjacent image segments (or "tiles"), such as 8-bit segments.

The system and method are particularly suited to use in high-speed, multi-function digital office products using an 8 bits per pixel copy software image path (SWIP) which allows greater image quality. However, the system and method are not limited to such image rendering devices or bit-depths and may find uses in other image compression applications.

The exemplary system and method recognize that an uncompressed, scanned image may contain significant background regions within a text document, for example, that compress extremely well, whereas images that contain mixed content, such as photographs or complex graphics, are generally less compressible. In either case, there may be significant image-quality and/or image-processing throughput-rate advantages of applying unique compression-specific settings which vary between highly-compressible and low-compressible image types.

The ability to estimate dynamically the compression ratio of either a segment or a full digital image prior to applying any compression algorithm may provide advantages in terms of both image-quality and image-processing throughput (rate).

A "digital image" or simply an "image" refers to an electronic version of a document (or a part thereof) to be processed in the image processing path of an image reproduction system. The digital image may correspond to a single page of the document, when rendered. The image generally comprises a plurality of pixels. The image is stored to memory as a compressed image in a suitable compression format such as BMP, JPEG, GIF, TIFF. When the compressed image is retrieved from memory, it may be decompressed and sent to the image path pipeline of the image reproduction system. In one embodiment, the digital image to be compressed is an 8 bits per pixel (bpp) image (or more than 8 bpp). The image may be a single color (monochrome) image or a color (multicolor) image having a plurality of color separations, such as a three (CMY) or four (CMYK) color separation image.

A given digital image may include text, graphics, photographic images, graphics, background regions, which are blank (all pixels off) or of a single color, or a combination thereof. The exemplary system and method do not need to make any assumptions about the content of the image prior to processing.

An "image reproduction system" renders a digital image in visual form, for example through printing the image on print media or displaying the image on a display device.

The "compression size" of a digital image or segment thereof represents the amount of memory occupied by the digital image/segment, following compression, and may be expressed in bytes.

The "compression ratio" of a digital image is a ratio of the size of the digital image before compression to the size of the digital image after compression and is therefore a number. Large numbers indicate a higher compression. For some applications, a threshold compression ratio (e.g., a maximum acceptable compression ratio) may be established, which takes into account the image quality requirements of the image reproduction system or other device which receives outputs from the image processing path.

The "compression speed" of a digital image is the time taken to compress an image of a predetermined size (in bytes) and may be expressed in microseconds (µs). For some applications, a threshold compression speed (e.g., a minimum acceptable compression speed) may be established which takes into account the processing speed of the image reproduction system or other device which receives outputs from the image processing path.

The "entropy" of a digital image (or segment thereof) is an estimate of the compressibility of the image (or segment) and is indicative of the randomness of the image (or segment). Entropy may be expressed as a percentage, as described below.

The "compression acceleration factor" or simply "acceleration factor" is an input parameter of a compression algorithm, such as a lossless data compression algorithm, e.g., LZ4 (a public domain Lempel Ziv variant, see github.com/lz4/lz4, released Sep. 11, 2018). The compression acceleration factor may be expressed as a number. An acceleration factor of 1 is the default compression factor offering a highest compression ratio, while higher values of the acceleration factor tend to increase compression speed but decrease compression ratio. The Sep. 11, 2018, open-source LZ4 compression algorithm provides a programmable acceleration factor which allows a tradeoff between compression speed and compression ratio.

With reference to FIG. 1, a functional block diagram of an image reproduction system 10 is shown. The image reproduction system 10 includes a computer-implemented digital image processing system 12 and an image output device 14, which are communicatively connected by one or more wired and/or wireless link(s) 16.

The image processing system 12 includes computer hardware components, such as memory 20, a processor 22, and one or more input/output (I/O) devices 24, 26, which are all communicatively connected by a data/control bus 28. The image processing system 12 receives a digital document 30 to be processed, e.g., via input device 24. The document 30 includes one or more uncompressed digital image(s) 32. The image processing system 12 compresses each input image 32 to form a compressed image 34, which occupies less memory than the input image 32 (except in cases where it is determined that compression is not appropriate, as discussed below). The image processing system 12 may subsequently decompress the compressed image 34, to form a decompressed image 36, before sending the decompressed image 36 to the image output device 14 for rendering. As will be appreciated, in addition to compression and decompression, the image processing system 12 may perform other operations on the image before and/or after compression/decompression to prepare it for rendering, such as cropping, rotation, changing from one color space to another, and the like.

The memory 20 stores instructions 40, which are executed by the processor 22, for performing the steps of the exemplary method. In particular, the instructions 40 include an optional segmentation component 42, a compression component 44, and an optional decompression component 46, which together form, in whole or in part, a software image path (SWIP) 48.

The segmentation component 42 takes as input the input (uncompressed) image 32 and segments it to form a plurality of segments 50, which may be non-overlapping and which together occupy the entire image 32. In one embodiment, the segments are equal-sized (the same number of pixels and pixel dimensions), e.g., rectangles or other regular shapes. In another embodiment, the segments are of variable size, which may be a function of image content, and may be non-regular in shape.

There may be 5, 10, 50, or more segments in the image, such as up to 1000 segments, each segment comprising only a portion of the input image 32. In the case of a multicolor image, such as a three or four-color image, each color separation may be treated as an image on its own and segmented separately. Thus, the number of segments generated=number of color separations×number of segments per separation. In the case of a CMYK image, which is partitioned into 100 segments per separation, for example, the number of segments 50 generated is 400. The input image 32 may be processed (including compression) in other formats such as RGB, Lab, $YC_bC_r$, or the like.

The compression component 44 takes as input each segment 50 and applies a lossless (or lossy) compression to the segment. The compressed image segments 52 forming the compressed image 34 are stored in memory, such as memory 20. Alternatively, if no segmentation component 42 is used, the compression component 44 applies compression to the input image 32 as a whole to form the compressed image 34. In some embodiments, compression is applied to fewer than all color separations.

The decompression component 46, where present, takes each compressed segment 52 and decompresses it to generate the decompressed image 36, which is substantially the same as the input image 32. Alternatively, if no segmentation has been performed, the decompression component 46 may decompress the compressed image 34 as a whole or segment it prior to decompression.

The decompressed image 36 is sent to the image output device 14 for rendering. The image output device may be a printer, copier, fax machine, or a combination thereof (a multifunction device (MFD)). In the illustrated embodiment, the image output device 12 renders the image on a substrate, such as sheets 56 of print medium, such as paper, using a marking material, such as one or more colored inks or toners. In the illustrated embodiment, the image output device 14 includes a sheet feeder 58, which feeds the sheets 56 from a stack 60 of sheets onto a paper path 62, in the direction of arrow A. The sheets are transported along the paper path to a marking engine 64, downstream from the feeder 58, by a suitable sheet transport mechanism (not shown). The marking engine 64 applies the marking material to the sheet to form a rendered image. The marking engine 64 may be a xerographic marking engine which forms the rendered image from toner particles, via an electrostatically charged photoreceptor. The toner particles are then fused to the sheet to form a printed sheet 66. Alternatively, the marking engine 64 may be an inkjet marking engine which renders the image using droplets of ink, or other suitable device for forming an image on print media. The printed sheet 66 is output to an output component 68, such as an output tray. The image output device 14 may include a controller 70, such as a CPU, which controls the operations of the components 58, 64, etc. of the image output device. Alternatively, the image processing system 12 may perform some or all of these functions. Optionally, a local user interface (UI) 72, such as an LCD screen, allows a user to communicate with the controller 70 and/or image processing system 12 to input commands and/or receive visually displayed information. For example, a user may input one or more image compression parameters. As will be appreciated, the image output device 14 may include additional components, such as more than one marking engine, post processing components, and the like.

Figure 2:
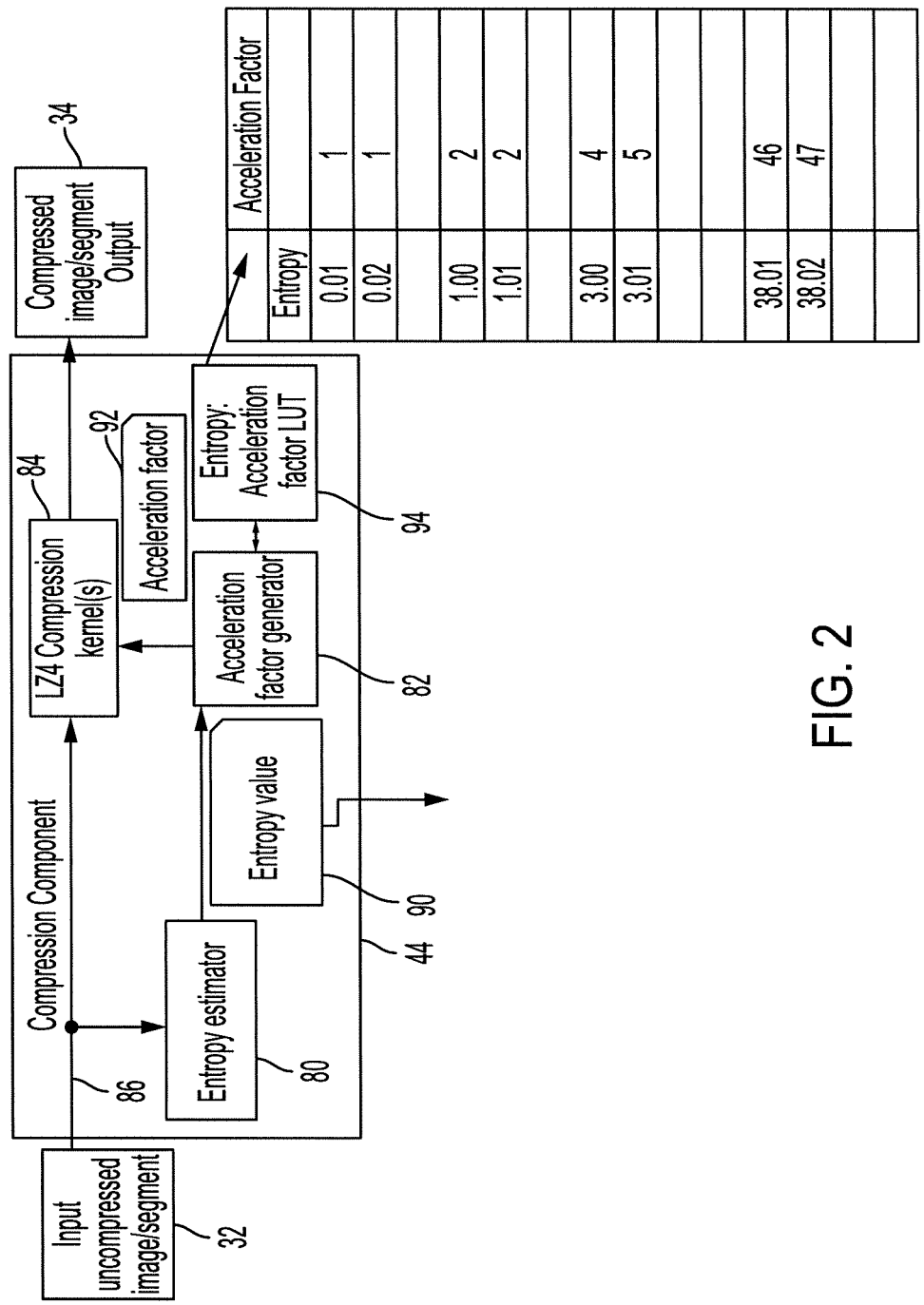
FIG. 2 illustrates a compression component of the image processing system of FIG. 1.

With reference now to FIG. 2, the exemplary compression component 44 of the system of FIG. 1 includes an entropy estimator 80, an acceleration factor generator 82, and a compression kernel 84, which are communicatively connected by links 86. In the case of a color image, one compression kernel may be provided for each color separation (i.e., 4 compression kernels 84 in the case of four color separations). In other embodiments, the same compression kernel is used for all color separations. In some embodiments, one or both of the components 80 and 82 may be combined with the compression kernel 84, rather than being separate components.

Briefly, the entropy estimator 80 generates a prediction of compressibility of the image/segment. In particular, the entropy estimator 80 takes as input the uncompressed image 32 (or an uncompressed segment 50 thereof) and computes an entropy value 90 (a compression ratio estimate) for the specific image 32 or segment 50.

The acceleration factor generator 82 receives the entropy value 90 and generates an acceleration factor 92 for the image/segment based on the entropy value 90. The acceleration factor 92 is a value, such as a positive integer value, which is at least 1 and which may go up to 32-bit integer values. The acceleration factor 92 may be generated by accessing a data structure 94, which encapsulates the relationship between entropy and acceleration factor, such as an entropy: acceleration Look Up Table (LUT), or other suitable data structure (e.g., an equation or graph). The data structure 94 is stored in memory which is accessible to the acceleration factor generator 82. In this dynamic approach, where the image is processed on a segment basis, each segment within an image 32 can have a different acceleration factor 92. The LUT 94 may be generated, as described below, using images/segments covering a range of entropy values. In some embodiments, the LUT 94 may be re-tuned, e.g., at intervals, to produce a desirable performance output. In some embodiments, more than one LUT 94 may be generated and used separately or concurrently to meet one or more specific performance requirements and/or product-specific requirements. For example, an LUT 94 may be provided that generates an acceleration factor which maintains or achieve a desired compression ratio.

The acceleration factor 92 generally influences the compression speed and the compression ratio, but the relationship is a function of entropy and is often non-linear. In the exemplary embodiment, therefore, an optimal compression acceleration factor 92 for a given image segment 50 is based on the real-time image data entropy measurement 90.

The compression kernel 84 has, as one of its input parameters, an acceleration factor. The kernel 84 receives as input the image 32 or segment 50 for which the acceleration factor 92 has been determined and compresses the image/segment using the computed acceleration factor 92. When the acceleration factor is 1, no compression is applied. In this way, different segments 50 of the same input image 32 and/or different input images having different compression acceleration factors 92 may thus receive different compression speeds. The compression kernel 84 may employ LZ4 compression, with the acceleration factor 92 accelerating the LZ4 compression processing. In other embodiments, another compression technique may be additionally or alternatively used, such as JPEG.

The computer-implemented image processing system 12 may include one or more computing devices, such as a PC, such as a desktop, a laptop, palmtop computer, portable digital assistant (PDA), server computer, cellular telephone, tablet computer, pager, combination thereof, or other computing device capable of executing instructions for performing at least a part of the exemplary method.

The memory 20 may represent any type of non-transitory computer readable medium such as random access memory (RAM), read only memory (ROM), magnetic disk or tape, optical disk, flash memory, or holographic memory, or combination(s) thereof. In one embodiment, the memory 20 comprises a combination of random access memory and read only memory. In some embodiments, the processor 22 and memory 20 may be combined in a single chip. Memory 20 stores instructions for performing at least a part of the exemplary method as well as the processed data 34, 36.

The interface(s) 24, 26 allow(s) the system to communicate with other devices via a computer network 16, such as a cable, local area network (LAN) or wide area network (WAN), or the internet, and may comprise a modulator/demodulator (MODEM) a router, a cable, and/or Ethernet port.

The digital processor device 22 can be variously embodied, such as by a single-core processor, a dual-core processor (or more generally by a multiple-core processor), a digital processor and cooperating math coprocessor, a digital controller, or the like. The digital processor 22, in addition to executing instructions 40 may also control the operation of the computer 12.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or the like, and is also intended to encompass so-called "firmware" that is software stored on a ROM or the like. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 3:
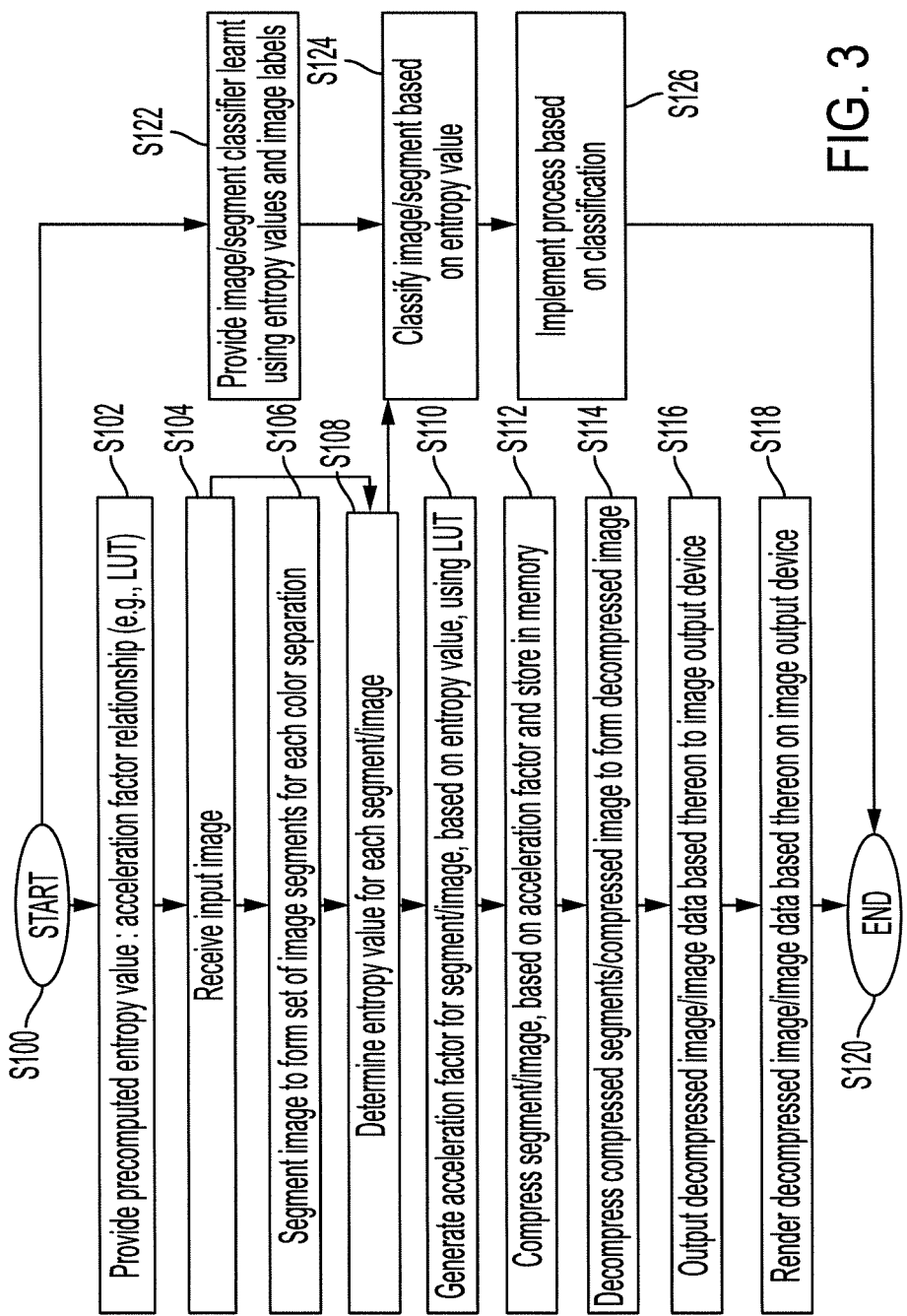
FIG. 3 is a flow chart illustrating an image processing method incorporating image compression in accordance with another aspect of the exemplary embodiment.

With reference to FIG. 3, a method for processing an image is shown, which can be performed with the system of FIGS. 1 and 2. The method begins at S100. The method assumes the provision of one or more compression kernels 84, which may be treated as a black box for purposes of the method.

At S102, a data structure, such as a LUT 94, which incorporates a computed entropy value: acceleration factor relationship, is provided, e.g., in a persistent part of memory 20. The LUT 94 allows an acceleration factor 92 to be generated for a given input entropy value 90. In some embodiments, S102 may include learning or otherwise generating the LUT 94.

At S104, an input image 32 to be compressed is received and may be stored in a temporary part of memory 20. In some embodiments, the input image 32 may undergo one or more preprocessing steps, e.g., one or more of background suppression, cropping, scaling, rotation, conversion from one format to another (e.g., RGB to CMYK), or the like. The preprocessed image is considered as the input image 32.

At S106, the input image 32 is segmented to form a set of segments 50, which may be of equal size and non-overlapping, as described in further detail below.

At S108, for each segment generated at S106, an entropy value 90 is computed, as described in further detail below.

At S110, the entropy value 90 is used to generate an acceleration factor 92 for the segment. This may include accessing the look up table 94. In some embodiments, linear interpolation may be used to compute an acceleration factor 92 for an entropy value 90 that lies between two entropy values in the look up table. In other embodiments, the assigned acceleration factor 92 is that of the closest entropy value 90 in the table 94.

At S112, compression is applied to the uncompressed segment 50, by the compression component 44, using the compression kernel 84 and the compression acceleration factor 92, which has been generated at S110, to generate a compressed image segment 52. The compressed image/segment is stored in memory. The memory needed to store the compressed image is lower, as compared with the input image, and the time taken for data/image transfer to and from memory is also lower.

At S114, the compressed image segments 52 forming a compressed image 34 are decompressed, by the decompression component 46, to form a decompressed image 36.

At S116, the decompressed image 36, or modified image data based thereon, is output to an image output device 14 for rendering.

At S118, the decompressed image 36, or modified image data based thereon, is rendered, e.g., on print media, by the image output device 14.

The method ends at S120.

In other embodiments, the segmentation step S106 is omitted. In this case, at S108, an entropy value 90 is determined for the entire image (or an entire color separation thereof) and at S110, the entropy value 90 is used to generate an acceleration factor 92 for the entire image/color separation. At S112, compression is then applied to the uncompressed image 32/color separation using the compression acceleration factor 92 generated at S110, to generate a compressed image 34.

In some embodiments, as an alternative to or in addition to image compression, the entropy value 90 is used for other purposes, such as image classification. In one embodiment, at S122 an image/segment classifier is provided. This may include learning a classifier to classify an image segment, or an entire image, based on the entropy value of its segment(s). For this, entropy values for training images/image segments that are labeled with known data types (e.g., text, graphics, background, photographic) are determined. The entropy values are used to learn a classifier which predicts the data type (or the likelihood of each of a set of data types), given the entropy value(s). The method proceeds through S102-S108 and then to S124, where the trained classifier is used to make such a prediction. At S126, a process may be implemented based on the predicted data type(s). Any number of different processes could benefit from such information. For example, the data types of images for a given MFD 14, or for a set of such devices, could be collected and used to identify print settings which are most appropriate to the predominant data type. In other embodiments, the data types could be used to control printing, e.g., by limiting some users to certain data types which are most likely to be work-related or by constraining the printing of non-work-related data types.

The method illustrated in FIG. 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 12 (for example, an internal hard drive of RAM), or may be separate (for example, an external hard drive operatively connected with the computer 12), or may be separate and accessed via a digital data network such as a local area network (LAN) or the Internet (for example, as a redundant array of inexpensive or independent disks (RAID) or other network server storage that is indirectly accessed by the computer 12, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hard-wired electronic or logic circuit such as a discrete element circuit, a programmable logic device such as a PLD, PLA, FPGA, Graphics card CPU (GPU), or PAL, or the like. In general, any device, capable of implementing a finite state machine that is in turn capable of implementing the flowchart shown in FIG. 3, can be used to implement the method for compressing an input image. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

Advantages of the system and method may include one or more of:

1. Enabling a measure of the compressibility of an image/segment (termed the entropy) to be calculated quickly, allowing dynamically selecting/modifying the compression algorithm(s) in order to optimize (or compromise) between the overall image-quality, compression ratio, and/or data processing throughput rates.

2. Providing an improvement in compression speed and ultimately, system performance while preserving an optimal compression ratio.

3. Applying a compression acceleration factor on a segment by segment basis.

4. Determining when not to apply compression (bypass compression) for better performance.

5. Ability to adapt system performance or memory performance, or both, dynamically.

6. Allowing employment of multiple LUT(s) for adaptation to various applications (e.g., overall optimal, speed optimal, size optimal, etc.).

7. Ability to apply LUT(s) dynamically to maintain or achieve a desired compression ratio.

The ability to estimate the compression ratio (as an entropy value 90) of an entire digital image (or partial image segment) prior to applying any compression algorithm has several advantages from an image-quality (IQ) perspective as well as from an image-processing throughput (rate) standpoint. The present relatively simple method for quickly calculating the entropy of an image allows dynamically selecting/modifying the compression algorithm(s) to either optimize (or compromise) between the overall image-quality, compression ratio, and/or data processing throughput rates.

Further details of the system and method will now be described.

Generation of the LUT (S102)

Given digital image data 32, 50, it can be shown that the LZ4 compression kernel characteristic dictates that a higher acceleration factor 92 provides a faster compression speed, but a lower compression ratio. The compression is thus a trade-off between compression speed and compressed image size. Further, it can be demonstrated that for a constant compression acceleration value, given a higher compression ratio, a higher compression speed is realized. This assumes that the digital image data type is compression friendly.

Additionally, it can be shown that there is a compression ratio saturation point. This suggests that there are certain image data types that will result in no compression benefit for any compression acceleration value applied. Since there is no gain in compression size, in these cases, it is more efficient not to compress the image data (bypass compression) and process it uncompressed. Applying compression on these types of image data is not only slower at this junction in the image pipeline, but can also result in additional processing expense downstream, where decompression is performed. These principles are demonstrated in the examples below.

The data type or the entropy value of digital image data dictates the relationship between compression speed and compression ratio. Accordingly, applying a compression acceleration value to an image, without considering the data type, could produce an unfavorable result. In the present system and method, the entropy estimator 80 assesses the compressibility of the input image 32 and/or each segment 50 thereof by dynamically measuring the entropy value of the incoming digital image data. It can be assumed that a linear relationship exists between the entropy value of the image data and its compressibility. That is, for a lower entropy value, a faster compression speed and a higher compression ratio are obtained, as compared to a higher entropy value.

Given that there is a relationship between an entropy value of an image/segment and its compressibility, a study of compression speed and compression ratio can be performed to determine an appropriate acceleration factor for each entropy value in a range of entropy values, such as at least 5, or at least 10, or at least 20, or at least 50 entropy values. In the examples below, using synthetic images generated for each entropy value starting from 0.00% to 48.00% in 0.10% increments, compression acceleration factors from 1 to 200 are evaluated to derive to an optimal compression acceleration factor 92 for each entropy value that provides an optimal tradeoff between compression speed and compression ratio, given a set of one or more constraints, such as minimum and/or maximum values of compression speed and/or compression size. The entropy range selected was expected to cover entropy values encountered in practice, however, a larger or smaller range using increments of smaller or larger size may be selected, depending on the image type, compression method, or other factors.

The results of the study may be stored in the entropy: acceleration Look Up Table (LUT) 94, which is accessible to the acceleration factor generator 82. The same method of computing entropy is used for generating the LUT 94 and for determining the entropy value of a segment (S108) and is described in further detail below. In some embodiments, the LUT 94 is generated automatically by the system 12. In other embodiments, the LUT 94 is generated offline, input to the system 12, and stored in system memory or in memory accessible to the system.

A set of considerations may be employed in determining the optimal acceleration factor and may include studying plots of compression speed vs acceleration factor and compression ratio vs acceleration factor, for a given entropy value. The considerations may include one or more of:

1. If the compression speed does not vary with increasing acceleration factor, but the compression ratio does vary, choose an acceleration factor which optimizes (e.g., maximizes) the compression ratio, given any constraints on compression size.

2. If the compression speed remains relatively constant with increasing acceleration factor, while the compression ratio drops rapidly, select an acceleration factor close to 1.

3. If the compression speed and compression ratio both drop with increasing acceleration factor, select an acceleration factor that provides a tradeoff between compression speed and compression ratio.

4. At higher acceleration entropy values, the compression ratio output begins to degrade exponentially and eventually converges to 1.0. At higher entropy values 90, the compression ratio is at the least worst and it is generally more efficient to bypass compression and process the image data in uncompressed form. In this case, there is no need to select an optimal acceleration factor.

In addition to, or as an alternative to the considerations, one or more constraints may be enforced, such as minimum/maximum compression speed/compression ratios. For example, a minimum compression speed may be established based on the operation speed of the image reproduction device 14. Similarly, a maximum compression ratio may be established to achieve a threshold image quality.

These considerations and/or constraints may be implemented automatically as a set of rules or used to guide and/or constrain a human observer to construct the LUT 94. The LUT thus may be constructed to provide an acceleration factor which results in an optimum compression speed, compression ratio, or tradeoff between the two, within the bounds imposed by the constraints.

Image Segmentation (S106)

Image segmentation is used, in the exemplary embodiment, to generate a set of non-overlapping segments 50 of each color separation of the input uncompressed image 32. The segments may be of equal size, although are not necessarily so. In one embodiment, the segments are all rectangular, although other shapes are contemplated. The segments are essentially small images that together make up the input image 32.

Figure 4:
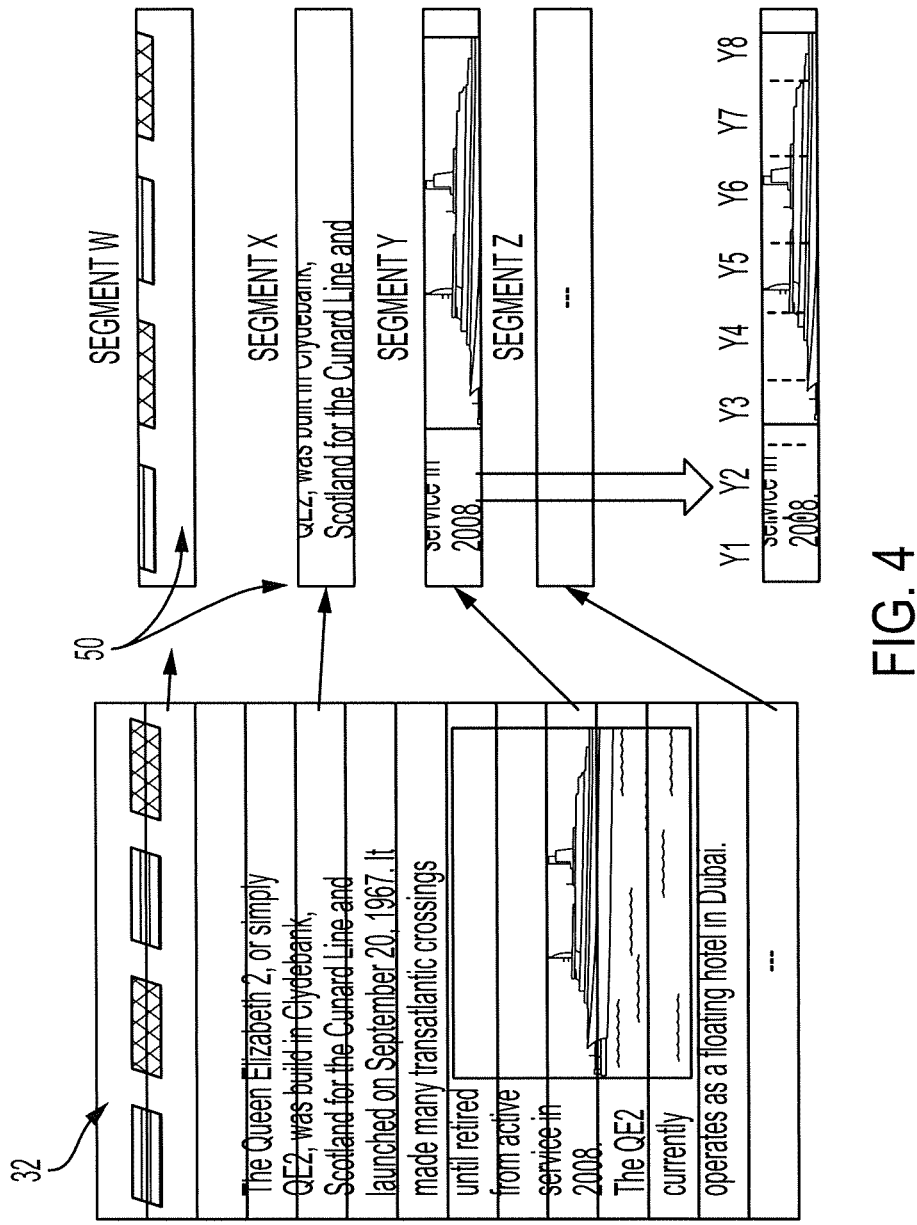
FIG. 4 graphically illustrates segmentation of an input image containing text, graphics, and photos.

FIG. 4 illustrates segments 50 formed by partitioning an illustrative image 32 in the X direction. The illustrated large segments 50 are full width segments, which span the entire width of the input image 32. These may be generated by segmenting the image into equally-sized strips. These large segments can be further partitioned in the Y direction to form equally sixed smaller segments, or tiles, as illustrated for tiles Y1, . . . , Y8 formed from segment Y. In this way, the image is segmented into an N×M array of tiles, where N and M are independently at least 2, such as at least 4, or at least 5. For convenience, the tiles are also referred herein to as segments 50.

One result of the segmentation is that each segment 50 is generally more uniform, in its data type(s), than the image as a whole. For example, some segments may be primarily a text data type, such as segment Y2, others, a primarily photographic image data type, such as segment Y8, others a primarily vector graphics data type, such as some of those formed from large segment W, while yet others may be a background data type (no "on" pixels or all "on" pixels having the same color (bit sequence)). As will be appreciated, different images 32 may be composed of fewer or more data types than the illustrated image. Segmenting the image 32 also allows the system 12 to take advantage of a multi-threaded CPU for parallel compression and/or decompression.

Segment/Image Entropy Computation (S108)

The entropy measurement 90 can be considered as analogous to thermodynamics, where a high entropy level is synonymous with high "disorder" of a system and a low entropy value corresponds to a highly-ordered (high-energy) system. In the present case, a random, highly disorganized image or segment compresses much less efficiently relative to a more spatially slow-varying, orderly image.

Figure 5:
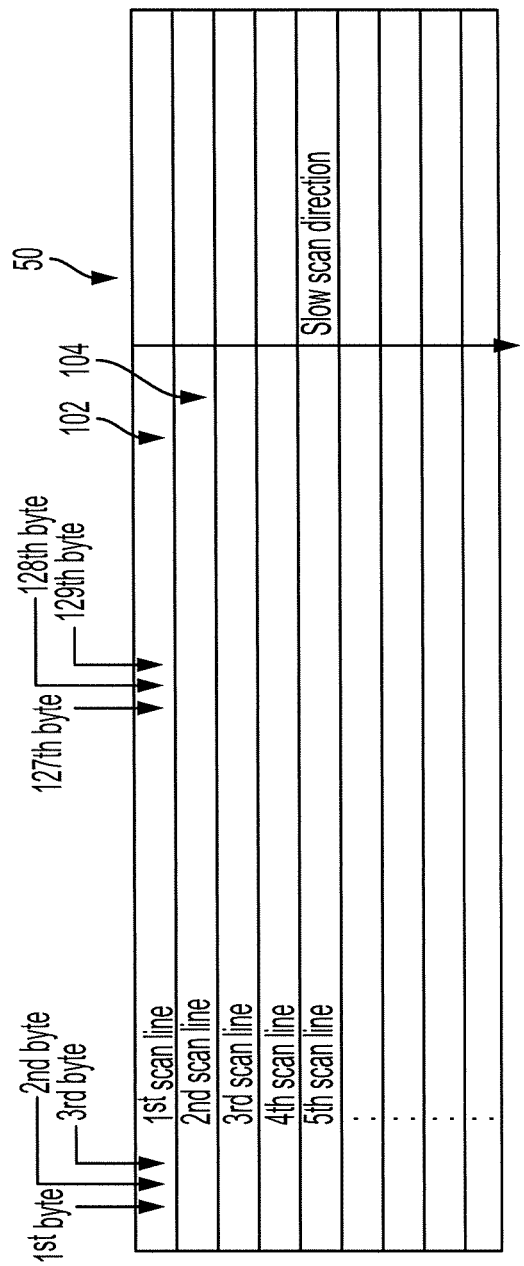
FIG. 5 illustrates a synthetic image used in identifying processing parameters for the exemplary method.

In one embodiment, the image (or partial segment) is considered as a stream of bytes (in a raster-like processing format). For example, consider the byte sequences that may be contained in a slow-varying 8 bits per pixel (bpp) image segment 50 illustrated in FIG. 5. Each scan line 102, 104, etc., may be considered sequentially in the same direction, e.g., from left to right. Starting with the first scan line, a difference is computed between the first and second bytes (or, more generally, bit sequences, where each bit sequence corresponds to a single pixel, or more than one pixel). Assume these bytes have values 11111111 and 11111110. Each bit is compared to its corresponding value in the other byte with an XOR operation. XOR indicates the exclusive disjunction, which is a logical operation that outputs true only when two bits differ. The output is thus 1 when the bits differ, otherwise 0. In this example, only one bit differs (the last), so the resulting number of difference bits is 1. However, at an edge of a feature of the image or other sharp change, the bit difference for a pixel could be as high as 8 for an 8 bpp image. Then, the second byte is compared with the third byte and so on until the end of the scan line is reached. The next (or a subsequent) scan line is processed in the same manner (e.g., left to right, or in the opposite direction, in a serpentine fashion). The number of difference bits is successively summed for the entire image or segment. The entropy value is based on the number of difference bits. It has been found that an entropy value which is a function of the number of difference bits generates a relatively accurate estimate with respect to how well digital images will compress. However, other methods for computing entropy are also contemplated, as described in the Examples below.

In one method, to calculate a global entropy value for an image 32 or segment 50, which represents how random or orderly the bit-sequence changes from one pixel/byte to the next, every successive byte (8 bits) in the sequence of the image is XOR'd with the next, with the resulting number of "on" bits successively summed for the entire image/segment, as described above. In another method, a subset of the bytes is considered, for example, by ignoring some of the scan lines.

The entropy value 90 (as a percentage) can be calculated as the total number of difference bits encountered within the image/segment, divided by the maximum number of possible bit sequences, which is based directly upon the image dimensions. This may be computed using Equation 1, or a function thereof:

$$\text{Image Entropy} = \frac{\sum_{N=1}^{N=Total\ Image\ Pixels} \text{Bitcount (Pixel}_N \wedge \text{Pixel}_{N+1})}{\text{max no of possible bit} - \text{sequence changes}} \quad (1)$$

or a function thereof, where the Bitcount (Pixel$_N$∧Pixel$_{N+1}$) is the bit difference between two successive bit sequences (each bit sequence corresponding to a respective pixel) within the image or segment's bit stream (in raster-like processing format), which is summed over the N pairs of pixels compared, and then divided by the maximum number of possible bit-sequence changes that could take place (which is a function of the total number of pixels contained within the image multiplied by the image's bit depth, or the number of bits-per-pixel). The maximum number of possible bit-sequence changes can thus be Total Image Pixels×Bits/Pixel (although it can be slightly less than this if the last pixel on one scan line is not compared with the first on the next). The result can be multiplied by 100 to convert to a percentage, although this is not strictly required.

The simplicity of this calculation is advantageous from an image-processing and implementation standpoint but is also Simultaneous-Instruction-Multiple-Data (SIMD)-friendly in order to accelerate the entropy calculation even further to provide a simplified method in which to predict how well the image will compress.

To reduce the time needed to calculate the entropy value, sub-sampling (e.g., in the slow-scan direction) may be incorporated within the entropy computation. Although the accuracy may degrade by using subsampling, leveraging the scanner's modulation transfer function (MTF) attributes ensures that any scanline-to-scanline pixel variations minimally impact the overall entropy estimate. Simulations revealed that sub-sampling by as much as one fourth (corresponding to ignoring scan lines 2-4 in FIG. 5, for example) can still generate sufficiently-accurate entropy estimates.

In the case of slow-scan subsampling, the image/segment entropy can be computed using Equation 2, or a function thereof:

$$\text{Image Entropy} = \frac{\sum_{N=1}^{N=Total\ Image\ Pixels} \text{Bitcount (Pixel}_N \wedge \text{Pixel}_{N+1})}{\left(\frac{\text{Total Image Pixels} \times \text{Bits/Pixel}}{\text{Slow Scan Sampling Rate}}\right)} \times 100\% \quad (2)$$

where the Slow Scan Sampling Rate is an integer which is at least 1 representing a frequency of sampling of scan lines in the image segment, e.g., =1, 2, 3, 4, etc. A Sampling Rate of 1 (every scan line is considered) yields the same result as Eqn. 1. A Sampling Rate of 2 corresponds to sampling alternate scan lines and a Sampling Rate of 4 corresponds to sampling every fourth scan line.

While in the exemplary embodiment, the entropy value 90 (e.g., expressed as a percentage) is used in computing an acceleration factor for modulating the LZ4 compression of a segment/image, there are other applications where deriving the image/segment entropy value may be useful. For example, the image/segment entropy value may be used to predict the image/segment's data type (e.g., text, graphics, photographic image or background), as described above in step S124.

Segment/Image Acceleration Factor Generation (S110)

In the exemplary embodiment, the predetermined LUT 94 is used to determine an acceleration factor 92 for a given image segment 50 or image 32. In one embodiment, the LUT is accessed with the entropy value 90 computed at S108 and the corresponding acceleration factor 92 is output.

For multi-color images, the same LUT 94 can be applied to each of the different color separations. As will be appreciated, this may result in one color separation (or a segment thereof) being given a higher acceleration factor than another color separation (or a segment thereof), if it has a different entropy value.

Segment/Image Compression (S112)

Image compression is applied to the segment (or image), based on the determined acceleration factor 92. Different compression methods may be employed, depending on the type of image data. The compression method may be lossless or lossy. For example, for 8 bpp color-copy and auto-color-copy image paths, segments of CMYK images may be compressed using a lossless LZ4 kernel 84. Segments of color scan-to-file $YC_bC_r$ images may be compressed via a lossy JPEG compression kernel 84.

In some embodiments, the compression kernel 84 is applied to only one (or fewer than all) channels of the data. For example, in compressing YCbCr images, the Y channel may be compressed with the exemplary compression kernel 84 using the determined acceleration factor 92, while the $C_b$ and $C_r$ channels may receive no compression or be compressed with a compression algorithm which is not based on an acceleration factor 92 determined as described above (for example, the acceleration factor may be fixed).

In the case of compressing segmented images, each image segment (and each color separation thereof) is individually compressed, with the resulting and final compressed image 34 consisting of a series of smaller compressed and concatenated image segments.

The present relatively simple method to quickly calculate the entropy of an image (or image segment) can be used to dynamically select/modify the compression algorithm(s) in order to either optimize (or compromise) between the overall image-quality, compression ratio, and/or data processing throughput rates.

Other uses of the entropy value computed as described herein may include:

1. Adjusting the mixed raster content (MRC) image attributes based upon the entropy value in scan-to-e-mail applications, where a higher entropy page may use a higher resolution (MRC disabled), whereas a lower entropy image may use default MRC settings.

2. The entropy value(s) may be incorporated as meta-data within images to help guide future compression processing needs/applications.

3. Rather than (or in addition to) using fixed-size image segments, the entropy values of individual image objects, such as trees, cars, buildings, animals, people, or the like, may be computed to assess the compressibility of each object for subsequent processing. In this case, each identified object may be considered as an image segment. Background regions (any region not identified as an image object) may be considered as a single segment or subdivided into smaller segments.

4. The entropy values may be used for images of greater than 8 bpp bit depths as well.

5. Entropy estimates may be computed for images with various rotated orientations. It is assumed that the entropy calculation is immune or agnostic to processing the image from left-to-right versus right-to-left. This is due to the nature of the exemplary method, where the total number of bit-count changes (by XOR'ing two successive pixels) will be the same at the beginning/end of every scanline, regardless of the left/right direction of processing. However, in some cases, the overall image entropy values may vary when processing the same images orthogonally (i.e., at 90°, 270°, etc.). This may be significant, for example, where an image is to be rotated followed by compression.

Without intending to limit the scope of the exemplary embodiment, the following examples illustrate implementation of the exemplary method.

Examples

1. Generation of an LUT

Figure 6:
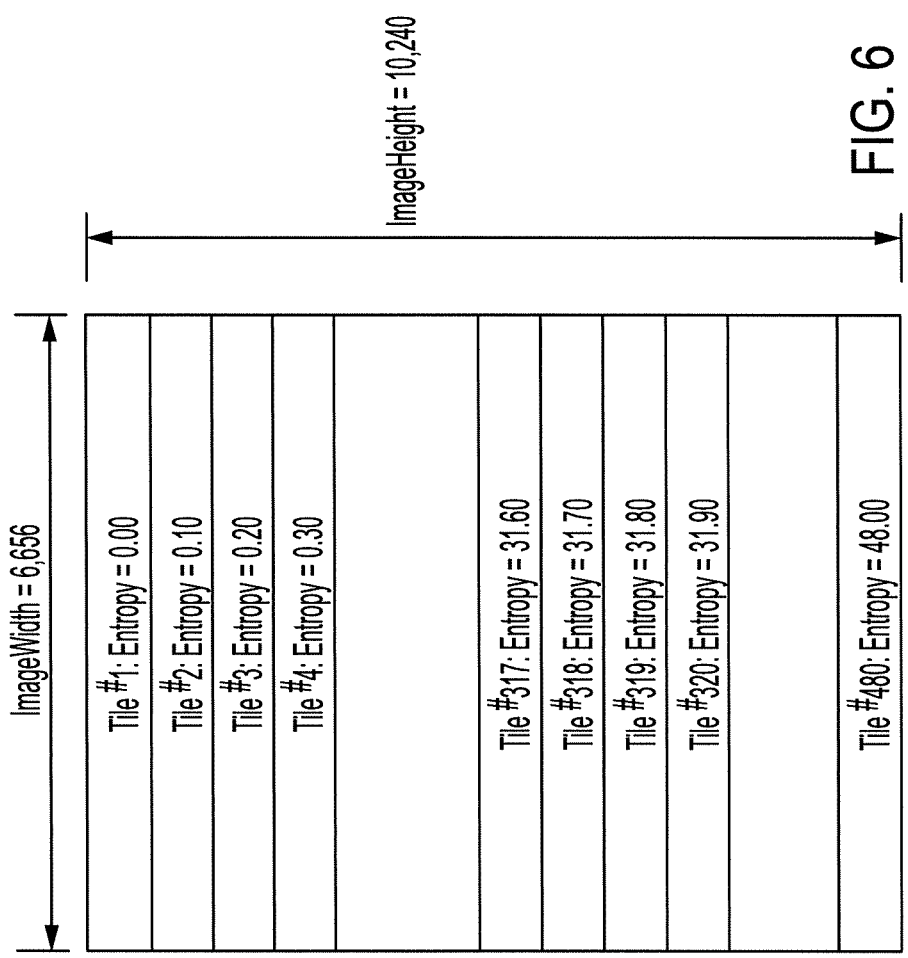
FIG. 6 illustrates a synthetically-generated tiled-image with monotonically increasing entropy values.

Compression speed and compression ratio profiles are first developed over a range of compression acceleration factors using synthetically-generated tiled-images with monotonically increasing entropy values, as illustrated in FIG. 6. For each entropy value starting from 0.00% to 48.00% in 0.10% increments, compression acceleration factors from 1 to 200 are evaluated to derive an optimal compression acceleration factor 92 for the corresponding tile. The entropy range selected is expected to cover entropy values encountered in practice.

Graphs, such as those shown in FIGS. 7-14, are obtained using a computer CPU. The compression speed graphs show some spikes, which may be artifacts due, for example, to the CPU having to run other processing applications at the same time. The presence of such artifacts could be reduced by running several experiments and averaging or otherwise aggregating the results. The compression ratio graphs show less variability but could also benefit from aggregating results of several runs.

Figure 7:
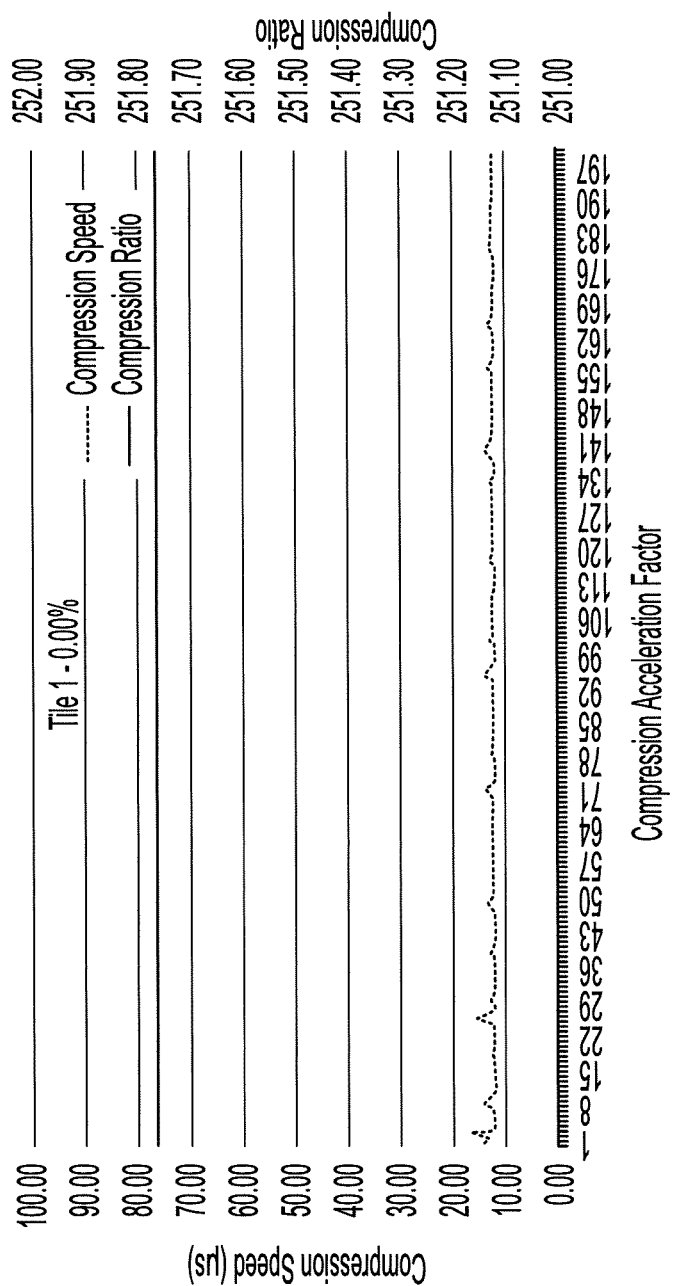
FIGS. 7-14 show plots of image compression speed (in micro-seconds) and compression ratio vs acceleration factor for a synthetic image with entropy values of 0.00%, 0.1%, 3.00%, 5.00%, 10.00%, 15.00%, 21.01%, and 28.01%, respectively.
Figure 8:
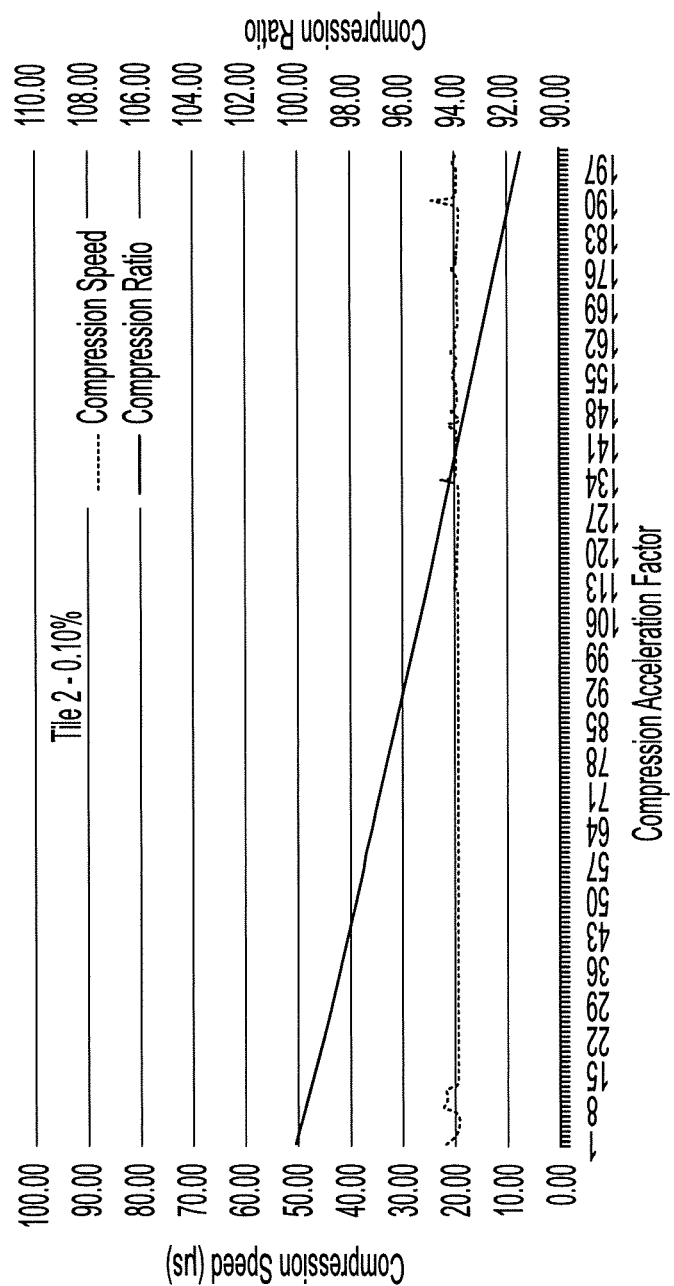
Figure 9:
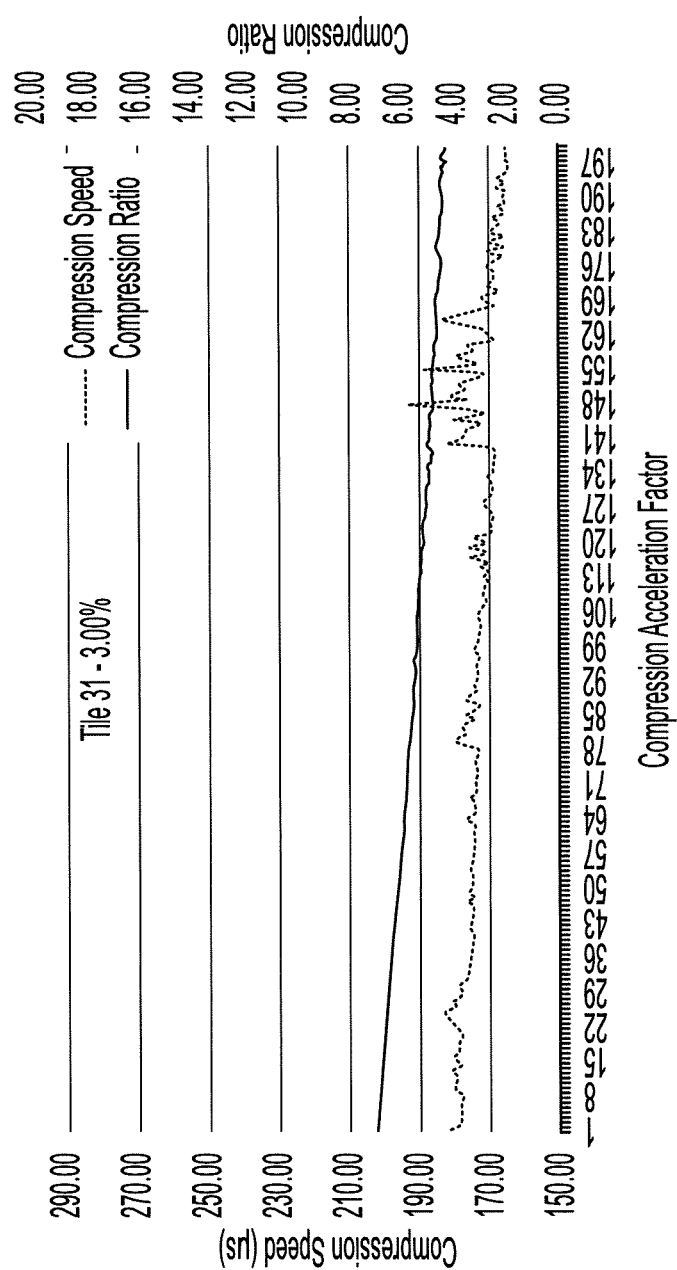
Figure 10:
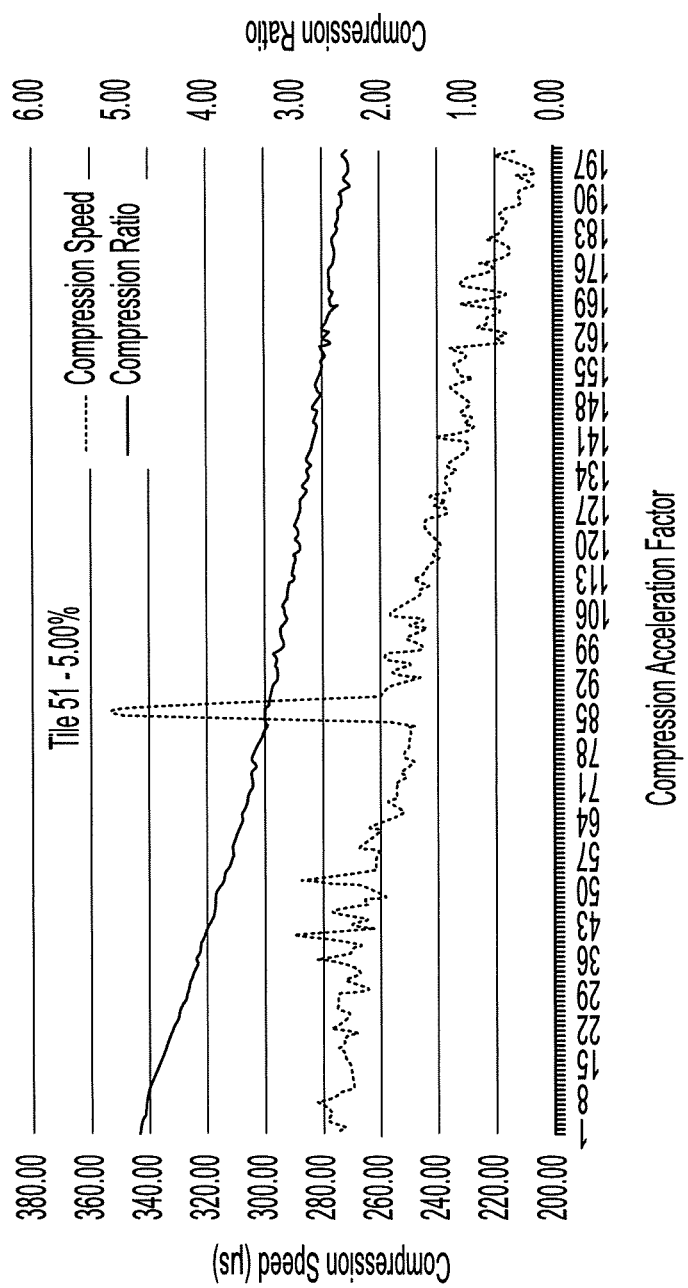
Figure 11:
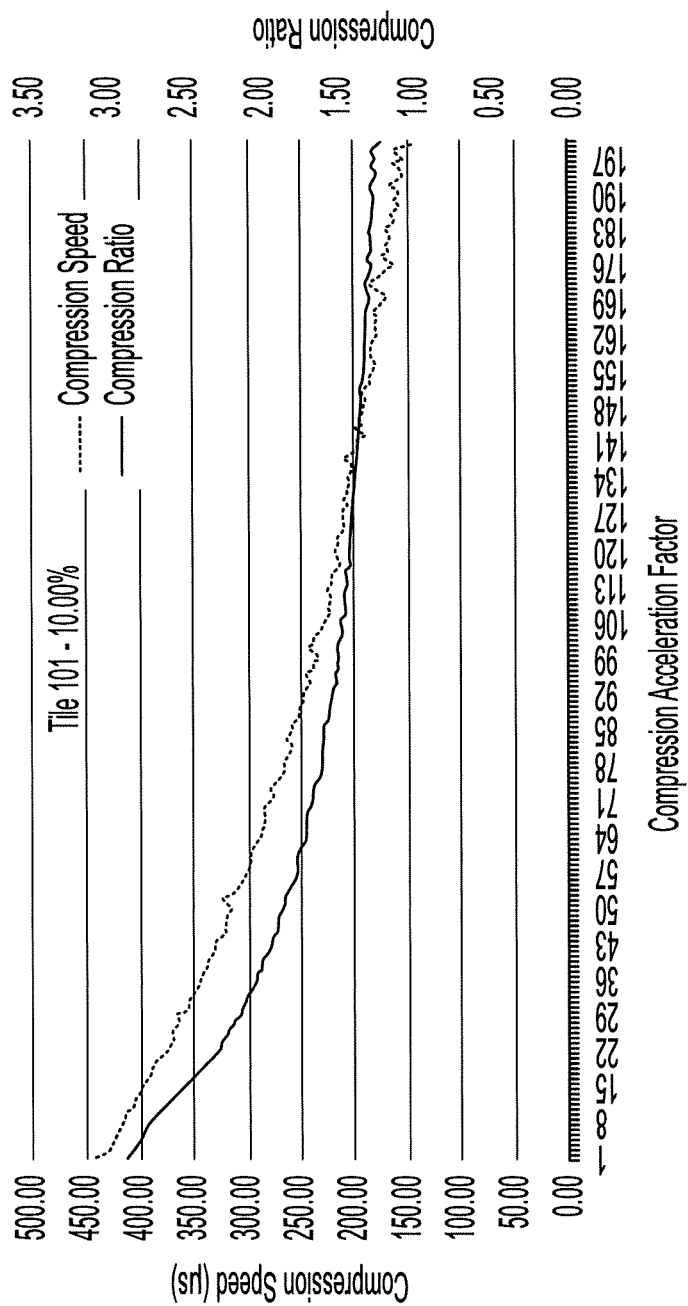
Figure 12:
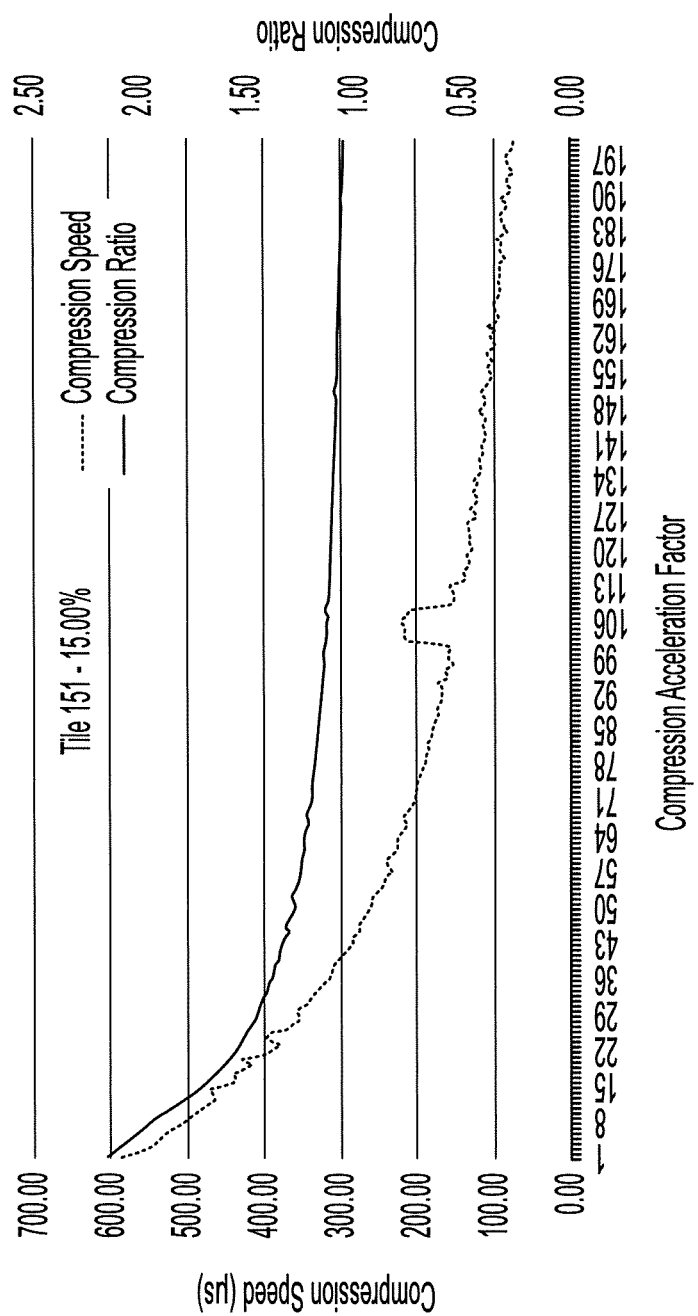
Figure 13:
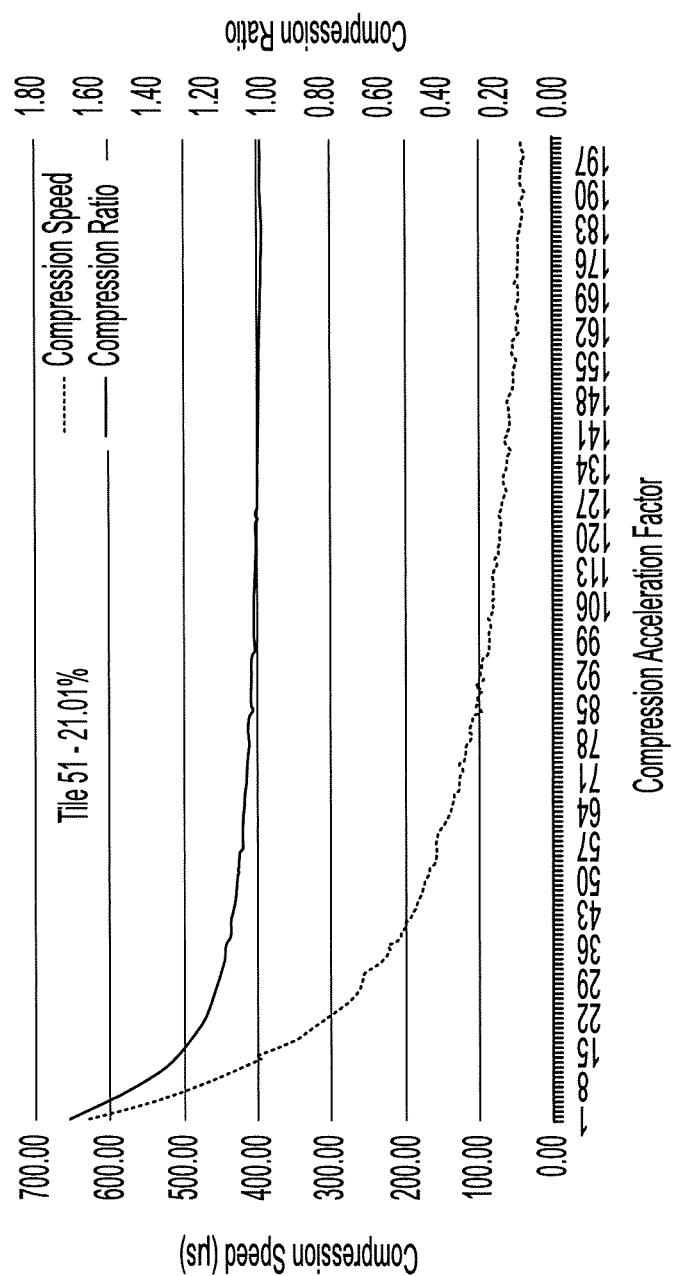
Figure 14:
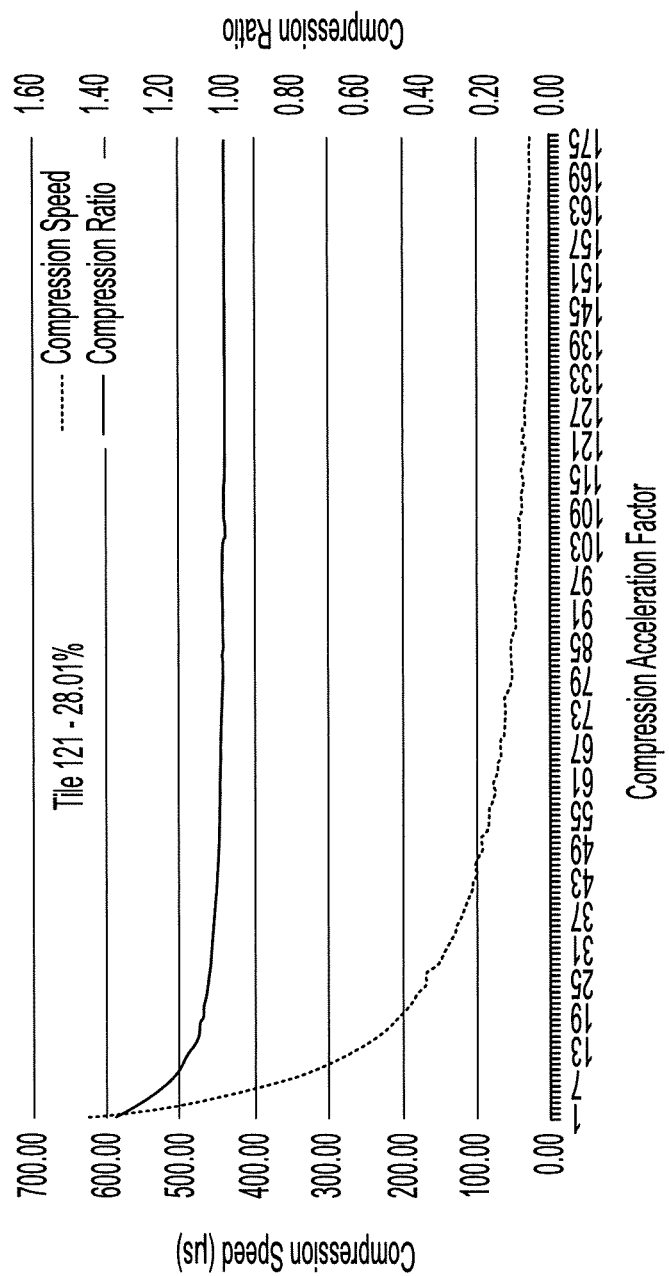

FIG. 7 is a graph representing the 0.00% entropy value (computed as described above) and shows the compression speed (in micro-seconds) and the compression ratio data points for acceleration factors from 0 to 200 for a given segment of an image, denoted Tile 1. FIG. 8 shows corresponding results for 0.10% entropy, for a given segment of an image, denoted Tile 2, and FIGS. 9-14 for compression acceleration factors of 3.00%, 5.00%, 10.00%, 15.00%, 21.01% and 28.01%, respectively. The profiles of the compression speed and compression ratio outputs for intermediate and higher entropy values were also obtained but have not been included for brevity.

The 0.00% entropy is a unique image data type, and in simple terms, it represents a purely blank image. Observing the data points in FIG. 7, the compression ratio (the right vertical axis) is at a maximum and remains constant regardless of the compression acceleration factor (the horizontal axis). Likewise, there is extremely low variability in the compression speed (the left vertical axis) for any given compression acceleration value. Therefore, it can be inferred that the compression acceleration value can be optimally chosen as 1.

When the entropy value is increased to 0.10%, as shown in FIG. 8, there is a greater variability in the compression ratio output in a form of linear slope over the compression acceleration range. At the same time, there is minimum variability in the compression speed output over the same compression acceleration range. Observing the compression speed data points closely, there is a minor improvement at the lower compression acceleration value as compared to the default value of 1. However, there is substantial compression ratio degradation at the higher acceleration values with no speed improvement whatsoever. For this entropy value, an optimal acceleration value can be selected, e.g., from 2 to 5.

The graphs in FIGS. 7-14, demonstrate three relevant factors. First, at 0.00% entropy, the compression ratio output is constant and at the maximum best. At the same time, the compression speed output has the best throughput regardless of the acceleration factor value applied. Therefore, an optimal acceleration factor is selected as 1. Second, as the entropy values increase, the compression ratio output begins to degrade, first, linearly for lower acceleration factors and then non-linearly for higher acceleration factors. In parallel, the compression speed output nearly mirrors the behavior or profiles of the compression ratio. At an entropy value of 1.00%, for example, there is variability only in the compression ratio. From the graph, it appears that selecting a lower compression acceleration factor, such as a value between 2 and 5 produces the best outputs in term of compression speed and compressed size. As the entropy increases to 5.00%, for example, there is variability in both the compression speed and compression ratio. Accordingly, selecting an optimal acceleration value becomes a process that involves a trade-off between compression speed and compression size. Finally, at higher entropy values, the compression ratio output begins to degrade exponentially and eventually converges to 1.0. That is, the image data is poorly compressed regardless of the acceleration factor applied. On the contrary, the compression speed continues to improve even at higher compression acceleration factors. However, as noted earlier, there is no benefit in compressing an image data with high entropy values. It is more efficient to bypass compression and process the image data in uncompressed form. In this case, there is no need to select an optimal acceleration factor.

The data is carefully studied, tested and analyzed to generate an optimal compression acceleration factor value for each entropy value from 0.00% to 48.00% in 0.1% increments. This result was then packaged into an entropy: acceleration look-up table (LUT). With this knowledge, an unknown image tile is dynamically measured. The resulting entropy value is converted to a compression acceleration value via the LUT. Finally, compression is applied to this tile using this compression acceleration value. Since this dynamic implementation is processed on a tile basis, each tile within an image can have a different acceleration value. Further, the LUT can easily be re-tuned to produce a desirable performance output. Further, more than one LUT(s) can be developed and used separately or concurrently to meet specific features performance requirement or products specific requirement. With the knowledge of the real-time entropy measurement, applying an optimal compression acceleration factor greatly improve system performance while maintaining a desirable compression ratio. The initial LUT developed has demonstrated an improvement in the scan speed by around 30%, with further improvements expected through refinement to the LUT.

2. Application of LUT

With the knowledge of the real-time entropy measurement, applying an optimal compression acceleration factor can greatly improve system performance while maintaining a desirable compression ratio.

A C/C++ bit-constrained software model was built to assist with algorithm development/refinement. In addition, a stand-alone Simultaneous-Instruction-Multiple-Data (SIMD) kernel was written and integrated within several stand-alone CV SDK (Computer Vision Software Development Kit) graphs in order to validate and measure performance. Finally, the SIMD version was "fused" within the CV SDK multi-threaded LZ4 kernel to dynamically modulate the compression acceleration factor in order to significantly accelerate compression speeds with minimal impact on the corresponding image compression ratios.

Intel® CV SDK is a collection of tools that combine video processing, computer vision, machine learning, and pipeline optimization into a single package.

The LUT is used for the software image path (SWIP) for color copy, auto-color, and color scan-to-file graphs using the compression module illustrated in FIG. 2. For the higher pixel depth color-copy and autocolor-copy image paths, the CMYK images are compressed via the lossless LZ4 kernel, whereas the color scan-to-file YCbCr images are compressed via JPEG. Each LZ4/JPEG compression kernel was designed to compress individual image segments or "tiles" in order to take advantage of the multi-threaded CPU capability of an Intel Apollolake device to boost overall processing throughput rates significantly. In other words, each image segment is individually compressed, with the resulting and final compressed image consisting of a series of smaller compressed and concatenated tiled images.

The acceleration factor generator 82 dynamically adjusts the LZ4's acceleration factor based upon the entropy estimator's entropy measure. In this case, the overall throughput rate of compressing the entire image is markedly improved with only a slight degradation in compression ratio.

3. Entropy Measurement

Different methods for estimating entropy with an entropy estimator 80 were evaluated. In one method, the standard deviation of each segment's histogram was calculated, where a high standard deviation is assumed to correspond to a low compression ratio whereas a low standard deviation value presumed to indicate a highly-compressible, high compression-ratio image. However, in some cases, an image with a low histogram standard deviation does not directly correspond to a highly-compressible image. For example, a relatively complex image with high frequency pixel variations (and presumably low compression ratio) may produce a low histogram standard deviation.

Figure 15:
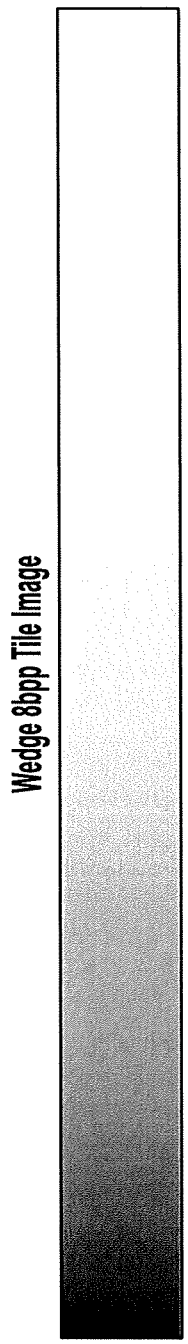
FIGS. 15 and 16 illustrate wedge and random segment images with matching histograms.
Figure 16:
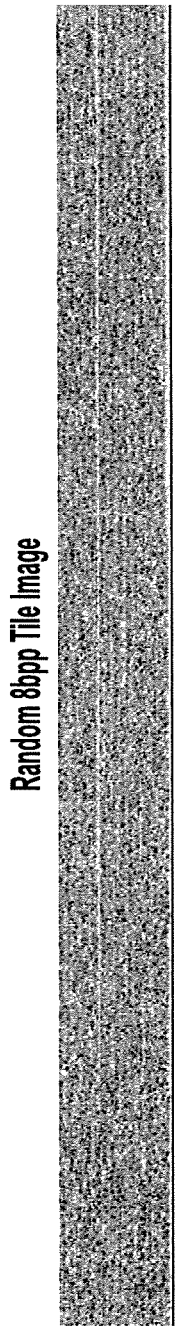
Figure 17:
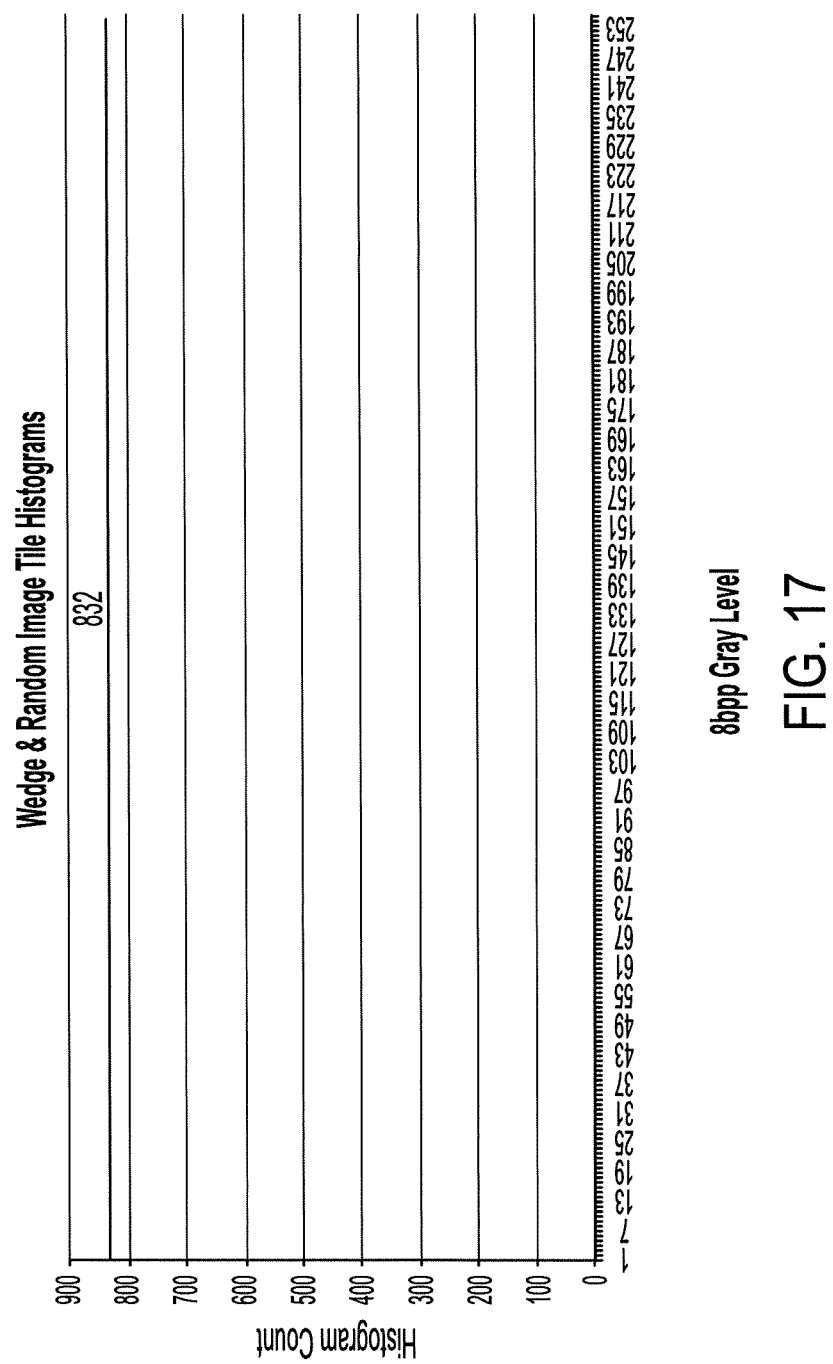
FIG. 17 illustrates the histogram of the wedge and random segment images of FIGS. 15 and 16.

For example, consider the wedge and random tile images shown in FIGS. 15 and 16. Here, the random image was created to precisely match the wedge image histogram (FIG. 17) by ensuring that each of the 8 bpp gray level counts (832 total) are the same throughout the image but at randomized locations. In this case, the random and wedge's histogram plots are exactly the same with a standard deviation equal to zero, however, the compression ratios are completely different when processing each 8 bpp image tile via LZ4 and JPEG. The wedge image compresses approximately 22 and 30 times better than the randomized image via JPEG and LZ4 compression, respectively, as illustrated in TABLE 3. This suggests that using the histogram of an image/segment has some limitations for accurately estimating the resulting compression ratios.

TABLE 3

| Segment | Image | Wedge | Random |
|---|---|---|---|
| Histogram | Mean | 832 | 832 |
|  | Standard Deviation | 0 | 0 |
| JPEG Compression[1] | Compressed Size | 7,720 bytes | 170,706 bytes |
|  | Compression Ratio | 27.6:1 | 1.24:1 |
| LZ4 Compression[2] | Compressed Size | 3,551 bytes | 107,506 bytes |
|  | Compression Ratio | 63.56:1 | 1.98:1 |

In another method, run-length encoding was evaluated as an entropy measure. Many compression schemes rely on run-length encoding as the primary mechanism for compressing an image. In this case, the slow-varying "wedge" image depicted in FIG. 15, in theory, should generate a low entropy value even though the histogram data spans the entire 0-255 range, resulting in a high standard deviation value. The random image, however, experiences many more "bit-to-bit" permutations during processing and as a result, generates a relatively high entropy value. In other words, the actual bit-for-bit pixel or byte changes that are encountered when processing an image in a raster manner are more relevant with respect to the degree to which the image will compress as opposed to the image's global histogram standard deviation value(s). Accordingly, the method described above using Equation 1 or 2 is a better predictor of compressibility than the histogram method, although the histogram method may still be useful in some cases.

[1]: The tile image data was inserted within the Y luminance channel of a $YC_bC_r$ image while setting the $C_b$ and $C_r$ color planes to "128" and subsequently processed via the JPEG compression CV SDK CPU kernel.
[2]: The tile image data was inserted as a single 8 bpp image and processed via the LZ4 compression CV SDK CPU kernel.

The entropy calculation relying on bit differences is relatively simple and is surprisingly robust and accurate at predicting the degree to which the image (or image segments) will compress. The C/C++ bit-constrained software model described above was written to run images with various image content to test and verify its performance. The resulting simulations and data collected via the C/C++ software model revealed that the entropy estimate is useful for predicting image "compressibility" for both LZ4 as well as JPEG compression algorithms.

Image Entropy Simulation Results

To test the accuracy of the entropy estimates against actual compression sizes/ratios when processing images via LZ4 or JPEG kernels, a synthetically generated segmented image with monotonically increasing entropy values was created. This was accomplished by incorporating a "calibration" mode within the C/C++ bit-constrained software model which systematically inserted a single, randomized gray level value and randomly placed this pixel within the assigned or designated segment. After each 8 bpp gray level pixel insertion, the entire segment's entropy value was recalculated. If the predefined entropy level was achieved (or slightly over), the segment was saved and concatenated at the bottom of the previous segment. The next segment's initial conditions would begin with the previous segment's image, with the process of inserting randomized pixels randomly placed within the "segment of interest" repeated. The final image was therefore composed of multiple predefined fixed width/height segments stacked one upon the other with monotonically increasing entropy steps.

Figure 18:
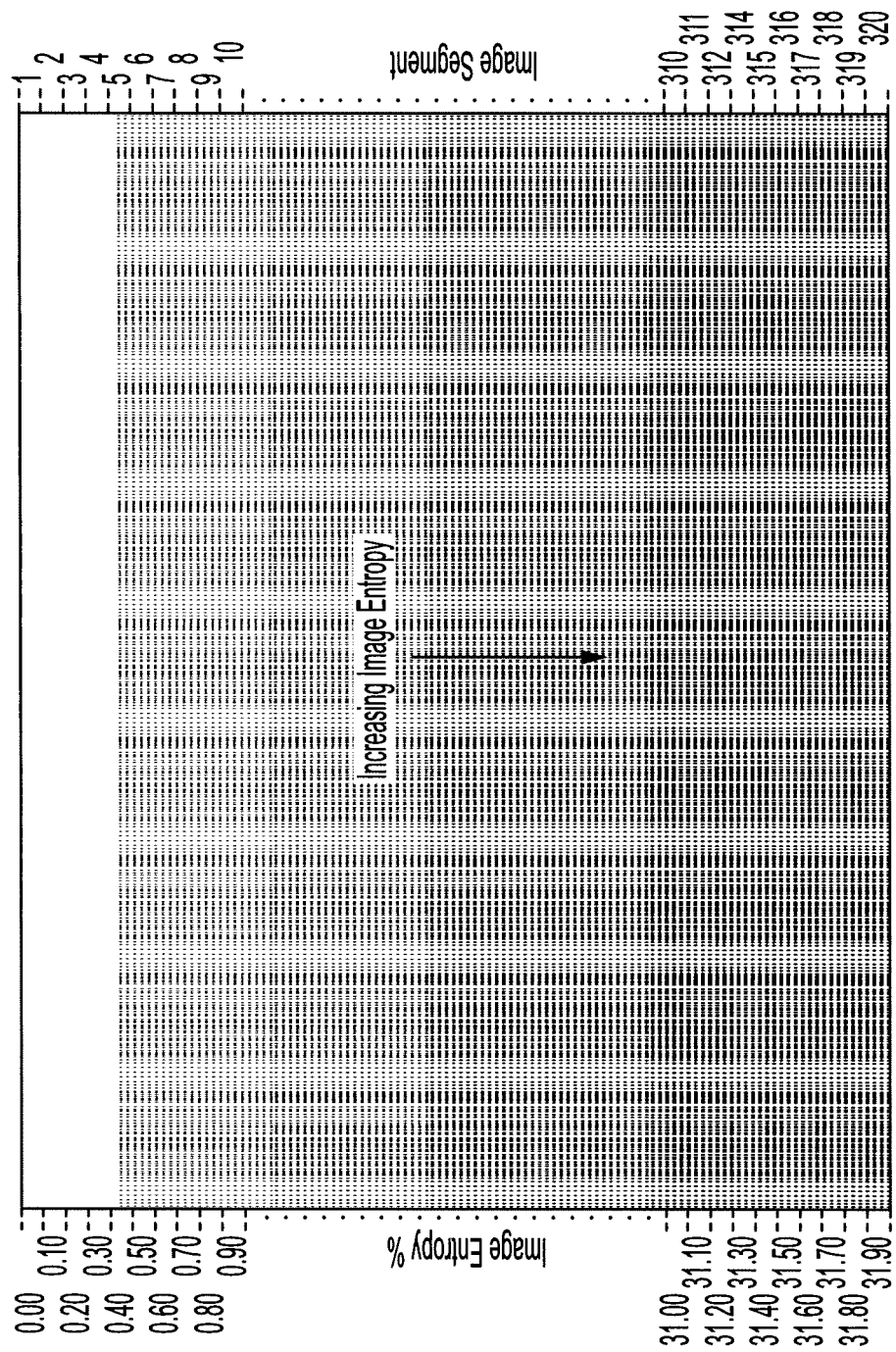
FIG. 18 illustrates a segmented image generated with entropy steps of 0.10 monotonically increasing from 0.00 to 31.90.

FIG. 18 illustrates the resulting segmented image that was generated with entropy steps of 0.10 monotonically increasing from 0.00 to 31.90. Each of the 320 pixel and scanline dimensions of a segment was set to 6,656 and 32, respectively, to match the image dimensions that the downstream multi-threaded LZ4 compression kernel would typically consume.

FIG. 19 is a plot showing the compression size in bytes for an image segment versus the entropy value of the image segment. FIG. 20 is a plot showing the compression ratio for an image segment, using LZ4 compression, versus the entropy value of the image segment.

To illustrate the correlation between the entropy estimates versus the resulting compression sizes/ratios for a more realistic image, a composite test image (FIG. 21) was synthetically generated using a mixture of scanned images with tile placements falling on mod-32 scanline boundaries to match the multi-threaded tile sampling cadence of the LZ4 kernel. In this case, each of the 10 large image segments contain a total of 16 tiles (small image segments) with a width of 6656 pixels and height of 32 scanlines per tile.

The illustrated test image includes both scanned as well as synthetically-generated images. For example, full width Image Segment #4 is a purely random image, whereas full width Image Segment #7 contains a slow-varying color sweep. Full width Image Segments #2, #6, and #9 contain uncompensated background regions along with mixed text, graphics, and photo regions. Full width Image Segment #3 contains a scanned image with high-frequency chromaticity components that may be observed in a granite countertop, for example.

Figure 21:
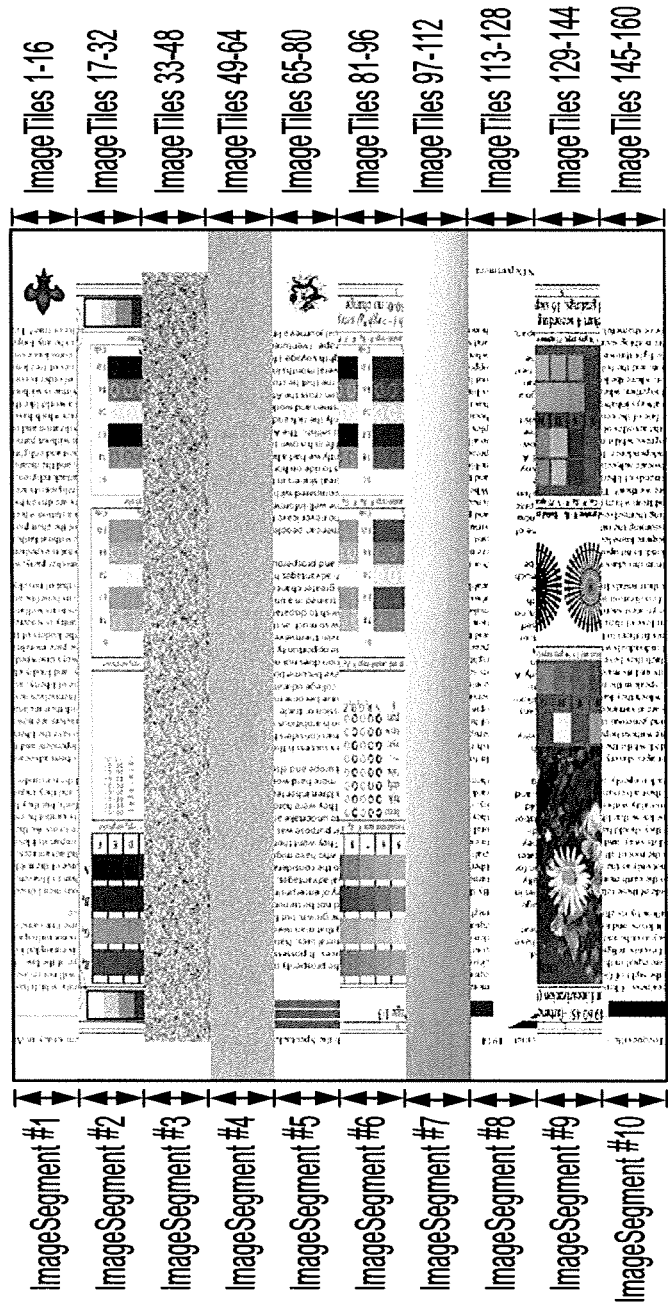
FIG. 21 illustrates a synthetically generated image that is segmented, in one direction, based on the image content.

In the color copy pipeline used for the evaluation, the input RGB image illustrated in FIG. 21 (shown in monochrome for ease of illustration) is converted to Lab color space for preprocessing, which includes background suppression, cropping, and scaling. The Lab processed image is then converted to CMYK. For each of the CMYK color separations, a separate instance of an entropy estimator 80 is employed to compute the entropy value 90. The LZ4 compression is then applied for each color separation.

It should be noted that in the final high-speed SIMD CV SDK implementation, the entropy estimation is integrated in the LZ4 kernels in order to accelerate the overall processing rate further, as opposed to separate stand-alone entropy instantiations.

FIGS. 22, 23, and 24 graphically show the correlation between the entropy values versus for the cyan color separation without slow-scan subsampling (i.e., Slow Scan Subsample Rate=1). Results were also obtained for the magenta, yellow and black color separations (not shown). It may be noted that the resulting LZ4 tiled image compression size profiles closely resemble the corresponding entropy estimates for each color plane and the compression ratios are inversely proportional to the compression size. The entropy estimates correlate extremely well with the scanned/synthetic image content contained within each one of the image-segments. In particular, the entropy profiles are virtually mirror images of the compression size plots for each CMYK color plane and can therefore be used to reliably predict image compressibility.

Image Entropy Subsampling

In any SWIP processing path, it is desirable for the entropy to have a low impact on the overall time in which to process and ultimately compress each image. In general, scanned images are not ideal candidates for entropy calculation due to the system's/scanner's modulation transfer function (MTF). In particular, the edges of text and/or graphics are blurred in a scanned image relative to a synthetically generated one (such as the clear lines encountered in print-ready images). In this respect, leveraging the scanned attributes of an image appears to be useful relative to skipping (subsampling) scanlines when deriving the entropy value of an image.

Figure 25:
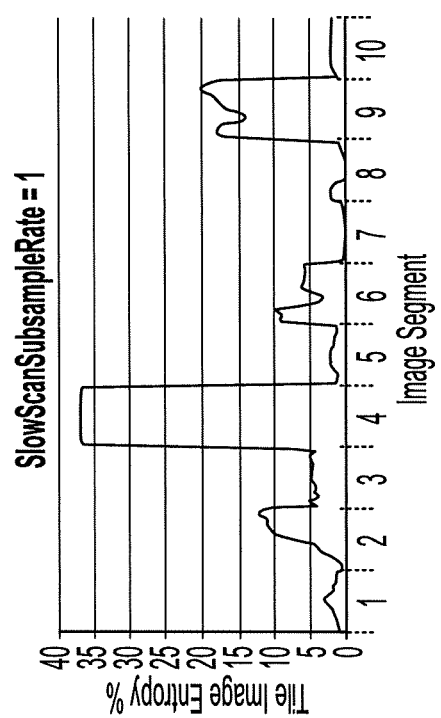
FIGS. 25-27 illustrate image segment entropy for the cyan component of the image of FIG. 21, using LZ4 compression at slow scan subsampling rates of 1, 2, and 4, respectively.
Figures 26, 27:
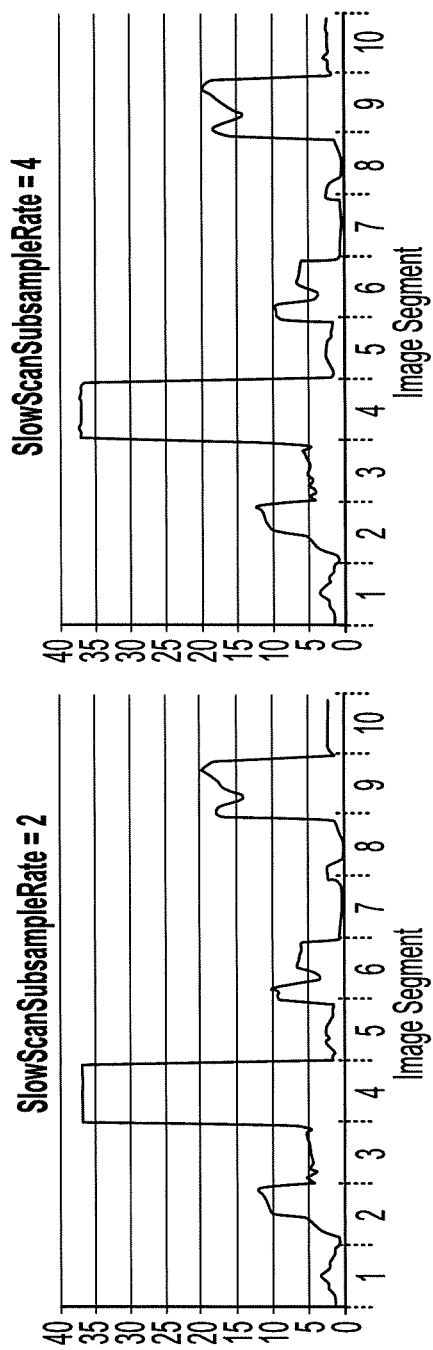

FIGS. 25, 26, and 27 show cyan entropy plots with the subsampling rate set to 1, 2, and 4. It can be seen that the entropy profiles are virtually the same, regardless of the subsampling rate, suggesting that the SIMD entropy processing times can be reduced by subsampling, without sacrificing accuracy.

Entropy Estimates for JPEG Compression Applications

Figure 28:
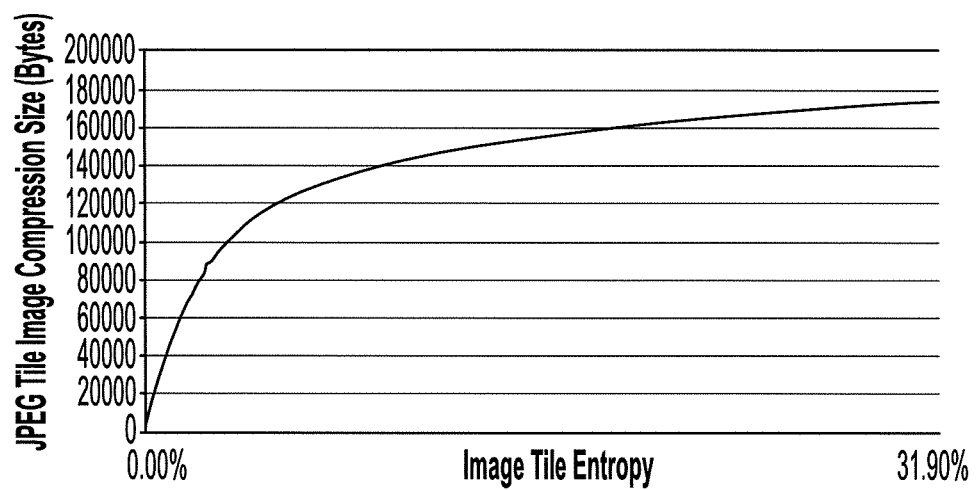
FIGS. 28 and 29 show compression size and compression ratio, respectively, of segments of the image of FIG. 18 using JPEG compression.
Figure 29:
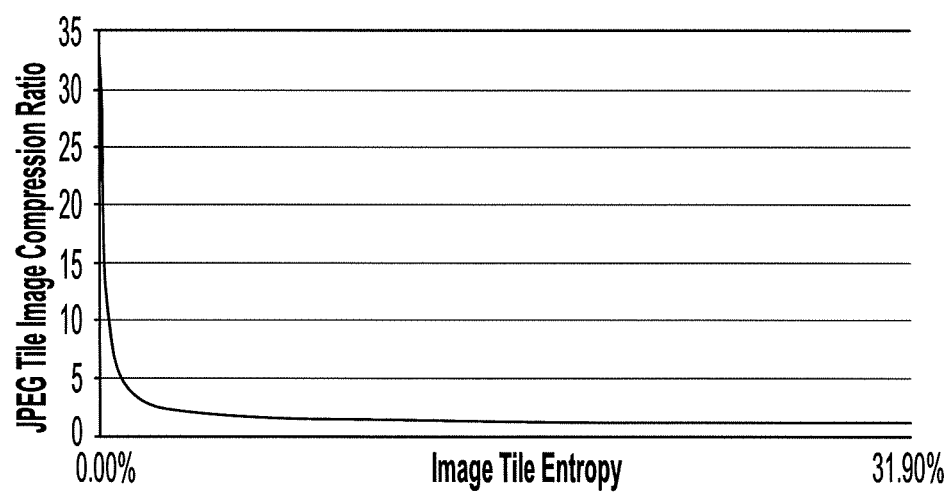

The correlation between image entropy and compression ratios when processing images via JPEG was also investigated. In the SWIP color scan pipeline, RGB images are converted to Lab space for preprocessing, as for the pipeline for LZ4 compression. The Lab preprocessed image is converted to YCbCr color space. One entropy estimator (CV SDK simd code that is used to generate the entropy on a per-tile, per-separation, basis) is instantiated and located on the luminance channel (Y) input. The same 0.00 to 31.90 entropy-step image (FIG. 18) was processed via JPEG (i.e., 320 image-tiles total), with the resulting compression size and ratios recorded for each tile. See FIGS. 28 and 29 for plots of JPEG tile image compression size (bytes) vs. image tile entropy and JPEG tile image compression ratio vs. image tile entropy.

Although the luminance channel was used here to illustrate the relatively accurate correspondence between the entropy estimate and the resulting compression size/ratio, additional simulations indicate similar levels of accuracy prediction and correlation between the chromaticity Cb and Cr channels as well.

Additionally, dynamically switching or modulating the JPEG quantization tables (Q-tables) as a function of the image entropy estimate may offer image quality or speed benefits.

For further details on the C/C++ model, see, for example, Alex X. Liu, et al., "Xengine: a fast and scalable XACML policy evaluation engine," Proc. 2008 ACM SIGMETRICS International Conf. on Measurement and Modeling of Computer Systems (SIGMETRICS '08), pp. 265-276 (2008). XACML is a recognized standard for specifying access control policies for various applications, especially web services. C/C++ first converts a textual XACML policy to a numerical policy, then converts the numerical policy with complex structures to a numerical policy with a normalized structure. Finally, it converts the normalized numerical policy to tree data structures for efficient processing of requests. However, standard C models or matlab code could alternatively be used.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. An image compression method comprising:
for each of a plurality of segments of an image, computing an entropy value of the segment, comprising:
considering the segment as a stream of bits, computing a bit difference between pairs of bit sequences in the stream of bits, and
computing an entropy value of the segment as a function of the bit differences;
for each segment, determining an acceleration factor based on the computed entropy value for the segment; and
compressing at least one color separation of the image, each segment within the image being compressed based on the respective computed acceleration factor for that segment.

2. The method of claim 1, wherein the bit difference is computed with an XOR operation.

3. The method of claim 1, wherein each of the bit sequences corresponds to one pixel of the image.

4. An image processing method, comprising:
for each of a plurality of segments of an image, computing an entropy value of the segment, comprising:
considering the segment as a stream of bits, computing a bit difference between pairs of bit sequences in the stream of bits, each of the bit sequences corresponding to one pixel of the image; and
computing an entropy value for the segment as a function of the bit differences according to the expression:

$$\text{Image Entropy} = \frac{\sum_{N=1}^{N=Total\ Image\ Pixels} \text{Bitcount}(\text{Pixel}_N \wedge \text{Pixel}_{N+1})}{\left(\frac{\text{Total Image Pixels} \times \text{Bits/Pixel}}{\text{Slow Scan Sampling Rate}}\right)},$$

or a function thereof,
where the Bitcount($\text{Pixel}_N \wedge \text{Pixel}_{N+1}$) is the bit difference between two successive pixels within the bit stream of the image segment,
N is the number of the pairs of pixels compared,
Total Image Pixels is the total number of pixels contained within the image segment;
Bits/Pixel is the number of bits-per-pixel; and
Slow Scan Sampling Rate is an integer which is at least 1 representing a frequency of sampling of scan lines in the image segment; and
processing the image based on the computed entropy values.

5. The method of claim 4, wherein the Slow Scan Sampling Rate is at least 2.

6. The method of claim 5, wherein the processing comprises compression of the image.

7. The method of claim 6, wherein the method further comprises for each segment, determining an acceleration factor based on the entropy value and compressing at least one color separation of the image segment based on the acceleration factor.

8. The method of claim 1, further comprising providing a data structure which links each of a set of entropy values to a respective acceleration factor.

9. The method of claim 8, wherein the data structure is based on at least one of compression ratios and compression times for segments having different entropy values.

10. The method of claim 1, wherein the processing further comprises decompression of the compressed image and printing the decompressed image.

11. The method of claim 1, wherein the segments are equally sized.

12. The method of claim 1, wherein at least some of the segments correspond to different-sized objects identified in the image.

13. The method of claim 1, wherein the plurality of segments comprises at least 10 segments.

14. The method of claim 1, further comprising segmenting the image into an N×M array of segments, where N and M are each independently at least 2, to form the plurality of segments.

15. An image processing system comprising:
memory storing instructions for performing the method of claim 1; and
at least one processor in communication with the memory for executing the instructions.

16. An image processing system comprising:
memory comprising instructions for:
computing an entropy value of at least one segment of an input image, comprising:
considering the segment as a stream of bits, computing a bit difference between pairs of bit sequences in the stream of bits, the bit difference being computed as a number of pairs of values in the pair of bit sequences for which an XOR operation outputs a difference, and computing an entropy value of the segment as a sum of the computed bit differences; and processing the image based on the computed entropy value; and a processor in communication with the memory for executing the instructions.

17. The image processing system of claim 16, wherein the at least one image segment comprises a plurality of image segments.

18. The image processing system of claim 16, wherein the processing of the image comprises compression of the at least one image segment.

19. An image reproduction device comprising the image processing system of claim 18 and an image output device which prints the image after decompression of the compressed at least one image segment.

20. An image processing method comprising:

segmenting an input image to form non-overlapping segments;

for one of the segments of the image, considering the segment as a stream of bits, computing a bit difference between pairs of bit sequences in the stream of bits, and computing an entropy value of the segment as a sum of the bit differences;

determining an acceleration factor for the image segment based on the computed entropy value; and compressing the image segment based on the acceleration factor.

21. The method of claim 1 wherein in the compression, for a segment with lower entropy value, a faster compression speed and a higher compression ratio are obtained, as compared to a higher entropy value.

* * * * *